United States Patent [19]
Bresler

[11] Patent Number: 5,973,801
[45] Date of Patent: Oct. 26, 1999

[54] METHOD FOR MATCHING COLORS OF AN OBJECT TO PRINTING COLORS

[75] Inventor: Yoav Bresler, Tel Aviv, Israel

[73] Assignee: Scitex Corp., Ltd., Herzlia Beit, Israel

[21] Appl. No.: 08/676,642

[22] Filed: Jul. 10, 1996

[30] Foreign Application Priority Data

Aug. 21, 1995 [IL] Israel ........................................ 115026

[51] Int. Cl.$^6$ ........................................................ G03F 3/08
[52] U.S. Cl. ............................ 358/520; 358/518; 358/523
[58] Field of Search ................................. 358/520, 518, 358/523, 504, 501, 517, 524, 527; 382/167, 164, 163; 348/431, 650, 651, 652, 672

[56] References Cited

U.S. PATENT DOCUMENTS

| | | | |
|---|---|---|---|
| 2,920,131 | 1/1960 | Valensi | 178/5.2 |
| 3,663,744 | 5/1972 | Harwood | 348/653 |
| 3,679,816 | 7/1972 | Avins et al. | 348/507 |
| 3,708,614 | 1/1973 | Nakabe et al. | 348/653 |
| 3,763,310 | 10/1973 | Sagishima et al. | 348/179 |
| 3,780,218 | 12/1973 | Rennick | 348/605 |
| 3,871,023 | 3/1975 | Caprio | 348/653 |
| 3,882,534 | 5/1975 | Srivastava | 348/653 |
| 3,959,813 | 5/1976 | Legler | 348/592 |
| 4,051,510 | 9/1977 | Cochran | 348/653 |
| 4,091,411 | 5/1978 | Sanada et al. | 348/605 |
| 4,296,432 | 10/1981 | Engel et al. | 348/652 |
| 4,314,274 | 2/1982 | Atoji et al. | 358/520 |
| 4,458,265 | 7/1984 | Yoshida et al. | 358/523 |
| 4,511,916 | 4/1985 | Fujimoto | 348/645 |
| 4,647,963 | 3/1987 | Johnson et al. | 358/518 |
| 4,668,979 | 5/1987 | Jung | 358/515 |
| 4,694,286 | 9/1987 | Bergstedt | 345/153 |
| 4,805,016 | 2/1989 | Kato | 348/71 |
| 4,811,108 | 3/1989 | Numakura et al. | 358/298 |
| 4,812,902 | 3/1989 | Fuchsberger | 358/521 |
| 4,819,077 | 4/1989 | Kikuchi et al. | 358/520 |
| 4,833,546 | 5/1989 | Numakura et al. | 358/534 |
| 4,857,994 | 8/1989 | Belmares-Sarabia et al. | 348/586 |
| 4,862,251 | 8/1989 | Belmares-Sarabia et al. | 348/577 |
| 4,864,357 | 9/1989 | Matsunawa et al. | 358/523 |
| 4,924,323 | 5/1990 | Numakura et al. | 358/456 |
| 4,928,167 | 5/1990 | Tatsumi et al. | 348/584 |
| 4,929,978 | 5/1990 | Kanamori et al. | 355/38 |
| 4,954,883 | 9/1990 | Belmares-Sarabis et al. | 348/584 |
| 4,956,718 | 9/1990 | Numakura et al. | 358/298 |
| 4,959,711 | 9/1990 | Hung et al. | 358/523 |
| 4,977,448 | 12/1990 | Murata et al. | 358/530 |
| 5,028,991 | 7/1991 | Sekizawa et al. | 358/537 |
| 5,060,060 | 10/1991 | Udagawa et al. | 358/520 |
| 5,072,305 | 12/1991 | Numakura et al. | 358/298 |
| 5,077,604 | 12/1991 | Kivolowitz et al. | 358/520 |
| 5,109,274 | 4/1992 | Washio et al. | 358/518 |
| 5,121,199 | 6/1992 | Aoki | 358/518 |
| 5,126,834 | 6/1992 | Enomoto et al. | 348/577 |
| 5,140,413 | 8/1992 | Suzuki et al. | 358/518 |
| 5,142,356 | 8/1992 | Usami et al. | 358/518 |

(List continued on next page.)

FOREIGN PATENT DOCUMENTS

0580365 A1 7/1993 European Pat. Off. .
2275584 8/1994 United Kingdom .

*Primary Examiner*—Edward L. Coles
*Assistant Examiner*—Madeleine Av Nguyen
*Attorney, Agent, or Firm*—Ladas & Parry

[57] ABSTRACT

A method for automatically matching the color of a printed representation of an object or swatch to that of the object or swatch itself is provided. The method includes the steps of measuring the colors of the object with a calorimeter. An object image, showing mainly the object, is produced and a representative image color is determined. From the colors of the object (as measured by a colorimeter or some other color measuring device), a representative object color is determined. Finally, the colors of the object image in the vicinity, in color space, of the representative image color are corrected to colors in the vicinity, also in color space, of the representative object color.

3 Claims, 6 Drawing Sheets

U.S. PATENT DOCUMENTS

| | | | |
|---|---|---|---|
| 5,204,948 | 4/1993 | Kato | 358/520 |
| 5,233,413 | 8/1993 | Fuchsberger | 358/518 |
| 5,255,076 | 10/1993 | Koyano | 348/653 |
| 5,270,808 | 12/1993 | Tanioka | 358/527 |
| 5,289,295 | 2/1994 | Yumiba et al. | 358/518 |
| 5,296,945 | 3/1994 | Nishikawa et al. | 358/518 |
| 5,317,426 | 5/1994 | Hoshino | 358/515 |
| 5,339,176 | 8/1994 | Smilansky et al. | 358/504 |
| 5,442,717 | 8/1995 | Murakami | 358/520 |
| 5,481,380 | 1/1996 | Bestmann | 358/504 |
| 5,497,431 | 3/1996 | Nakamura | 358/520 |
| 5,537,516 | 7/1996 | Sherman et al. | 395/109 |
| 5,596,428 | 1/1997 | Tytgat et al. | 358/520 |
| 5,612,795 | 3/1997 | Dichter | 358/520 |
| 5,659,490 | 8/1997 | Imamura | 358/526 |
| 5,696,839 | 12/1997 | Siegeritz | 358/520 |

METHOD FOR MATCHING COLORS OF AN OBJECT TO PRINTING COLORS

FIELD OF THE INVENTION

The present invention relates to color matching generally and to matching of reproduced colors of clothing in particular.

BACKGROUND OF THE INVENTION

Color brochures, catalogs and magazines contain many colored images. In mail order catalogs, the printed images are images of real things, such as clothing, which the producer of the catalog wishes to sell. Since the buyer does not see the object being bought until it arrives on his or her doorstep, the buyer wants the image he views to match the object as closely as possible. This is particularly important for clothing, in which the buyer often buys a product to match, in color, an already owned outfit. If the color printed in the catalog is not a close, if not exact, replica of the actual color, the buyer may find himself with an unacceptable match which he will return to the seller. Therefore, it is important to reproduce the colors in a mail order catalog as closely as possible.

There are many ways to match the color. Typically, a photograph is first taken of the object to be sold, after which, the photograph is scanned to produce a digital image thereof. Alternatively, the images are obtained by digital photography. A mask is produced which separates the object, for example a skirt, from the other elements in the image. Color specialists then view both the masked digital image (i.e. the image of the object itself), a color book containing many patches of color printed by the target printing process and the object to be sold and changes the colors of the digital image to colors which more correctly match those of the object. This is a difficult process since the object typically has shape and texture and since shadows might fall on the object due to the illumination arrangement.

The digital image is then printed on a proofer which provides an indication of the colors which will be printed in the actual catalog. Once again, the color specialist may change the colors in the digital image such that the colors of the proof will more closely match those of the object to be sold.

Finally, the digital image is printed on a printing press. Since the color range and quality of proofers do not match that of printing presses, it is possible that the colors which are printed by the printing press might not be the desired ones. It is known to automatically match the colors of the proofer and printing press so as to avoid this problem. One such automatic color correction scheme is discussed in U.S. Pat. No. 5,339,176. Other color correction schemes are described in the following patents:

| | |
|---|---|
| 2,920,131 | 3,663,744 |
| 3,679,816 | 3,708,614 |
| 3,763,310 | 3,780,218 |
| 3,871,023 | 3,882,534 |
| 3,959,813 | 4,051,510 |
| 4,091,411 | 4,296,432 |
| 4,314,274 | 4,458,265 |
| 4,511,916 | 4,647,963 |
| 4,668,979 | 4,694,286 |
| 4,805,016 | 4,811,108 |
| 4,812,902 | 4,819,077 |
| 4,833,546 | 4,857,994 |
| 4,862,251 | 4,864,357 |

-continued

| | |
|---|---|
| 4,924,323 | 4,928,167 |
| 4,954,883 | 4,956,718 |
| 4,959,711 | 4,977,448 |
| 5,028,991 | 5,060,060 |
| 5,072,305 | 5,077,604 |
| 5,109,274 | 5,121,199 |
| 5,126,834 | 5,140,413 |
| 5,142,356 | 5,172,244 |
| 5,204,948 | 5,233,413 |
| 5,255,076 | 5,270,808 |
| 5,289,295 | 5,296,945 |
| 5,317,426 | |

SUMMARY OF THE PRESENT INVENTION

It is an object of the present invention to provide a method for automatically matching the color of a printed representation of an object or swatch to that of the object or swatch itself.

The method operates as follows: a colorimeter measures the colors of the object. An object image, showing mainly the object, is produced and a representative image color is determined. From the colors of the object (as measured by a colorimeter or some other color measuring device), a representative object color is determined. Finally, the colors of the object image in the vicinity, in color space, of the representative image color are corrected to colors in the vicinity, also in color space, of the representative object color.

Preferably, the luminance, hue and saturation (LHS) values of a representative sample of the color gamut of a printing press on which said image is to be printed is measured, thereby producing a color conversion book converting from ink values to calorimeter values.

Additionally, in accordance with a preferred embodiment of the present invention, the representative colors are in the LHS color space and are determined from a set of colors (either the measured set of colors measured or the set of colors within the object image). To do so, the present invention a) generates a histogram of saturation weighted hue from the hue and saturation values of the set of colors; b) selects the hue having the most saturation as the representative hue, c) generates the saturation level close to the saturation level at which the representative hue was found and d) generates the luminance level associated with the representative hue. The representative luminance hue and saturation levels are then converted to their corresponding inking values.

Finally, the present invention also incorporates the method of determining a representative color of a set of colors as described hereinabove.

BRIEF DESCRIPTION OF THE DRAWINGS AND APPENDIX

The present invention will be understood and appreciated more fully from the following detailed description taken in conjunction with the drawings in which.

Appendix A is a listing of source code for implementing the method of the present invention.

DETAILED DESCRIPTION OF THE PRESENT INVENTION

Figure 1:
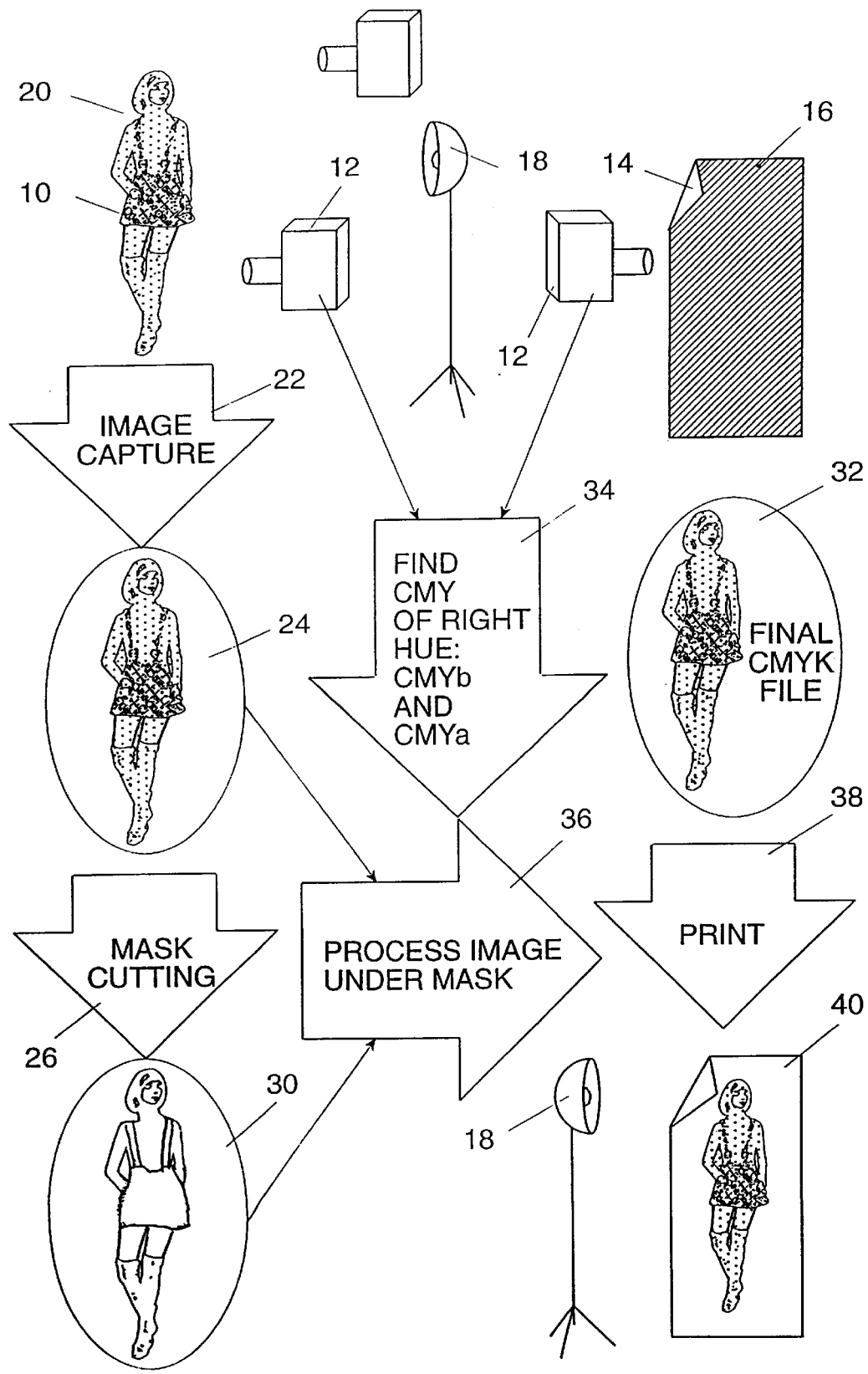
FIG. 1 is a pictorial workflow illustration of the swatch matching technique of the present invention.
Figure 2:
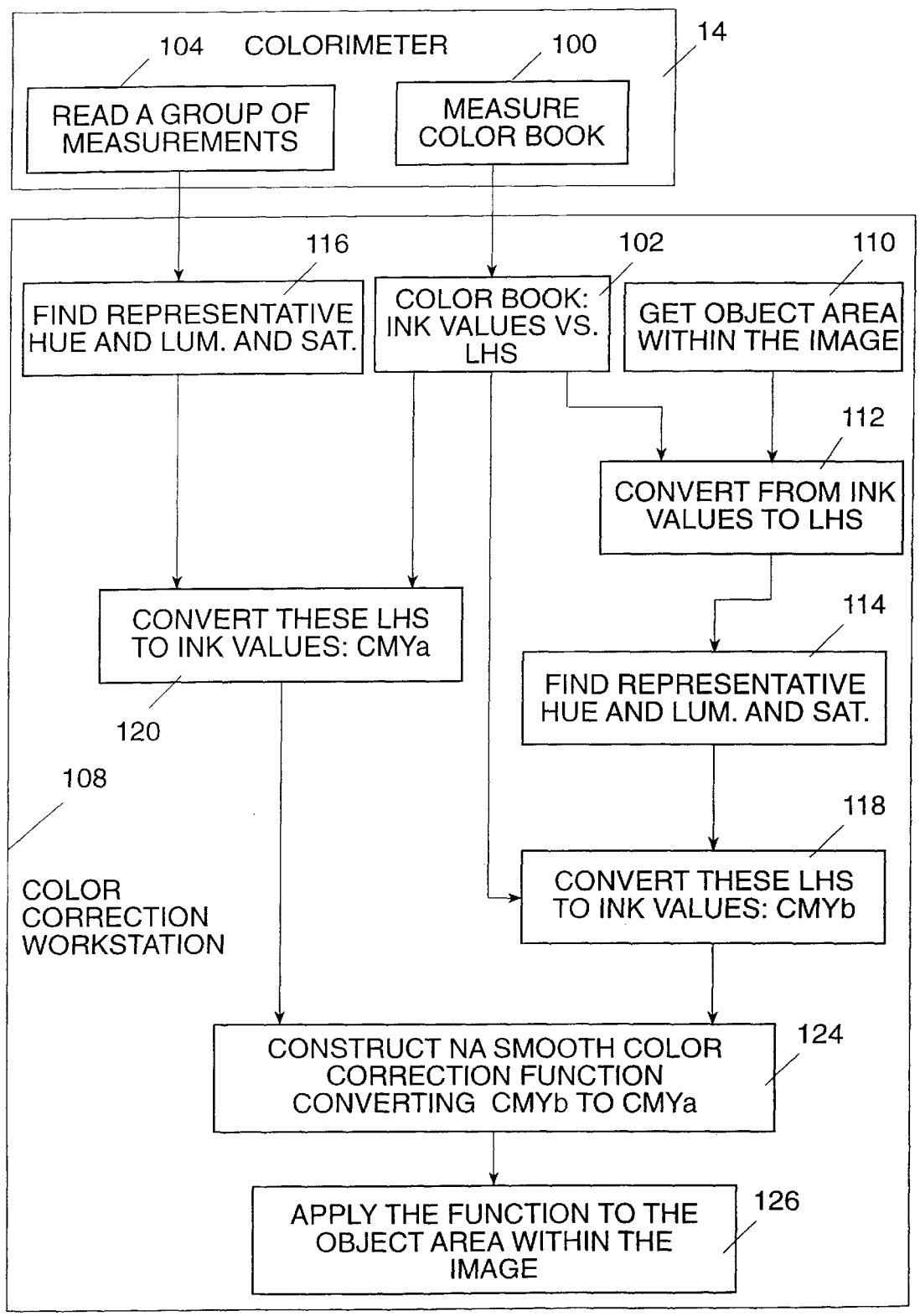
FIG. 2 is a general flow chart illustration of a swatch matching method, constructed and operative in accordance with a preferred embodiment of the present invention.
Figure 3:
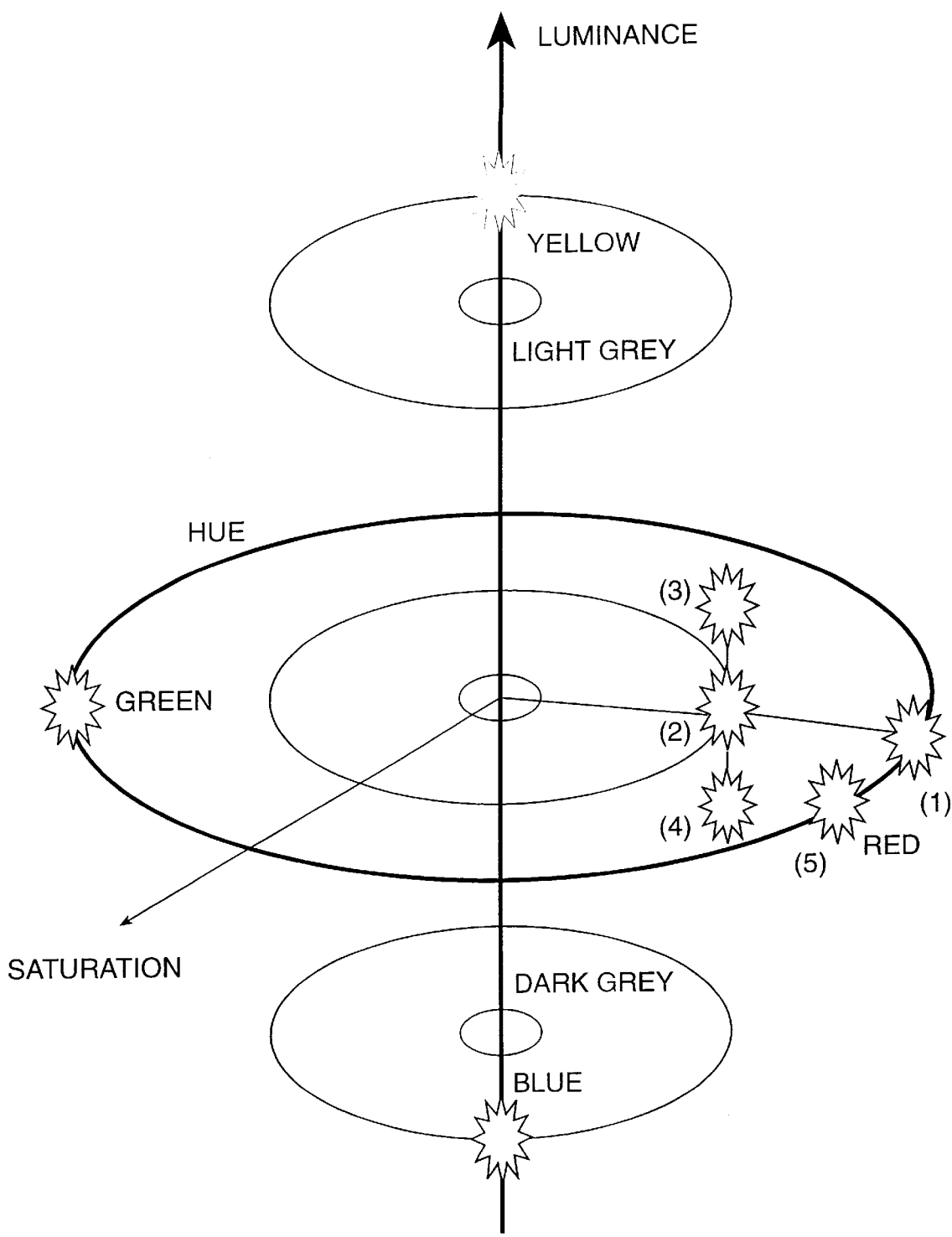
FIG. 3 is a schematic illustration of luminance, hue and saturation (LHS) space, useful in understanding the method of FIG. 2.
Figure 4:
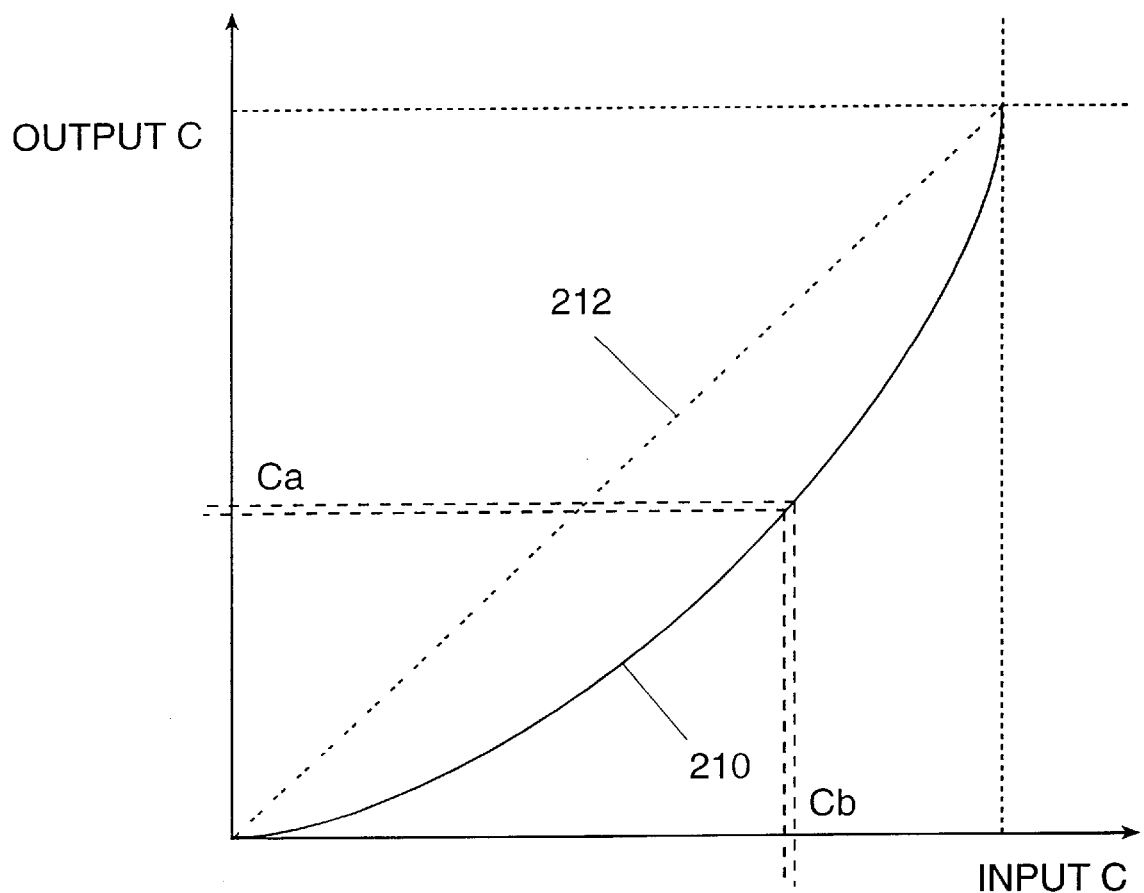
FIG. 4 is a graphical illustration of a color conversion function useful in understanding the method of FIG. 2.

Reference is now made to FIGS. 1, 2, 3 and 4 which generally illustrates the swatch matching method of the present invention. FIG. 1 pictorially illustrates the workflow, FIG. 2 illustrates the operations in a flow chart format, FIG. 3 illustrates a color conversion function and FIG. 4 illustrates the color space within which the present invention operates.

FIG. 1 illustrates, as an example, an object 10 which is a dress worn by a model. It will be appreciated that the present invention is operative for any object, such as clothing, which has three-dimensional curves such that parts of the object appear to have different colors due to shadows and other changes in light levels. As will be described in more detail hereinbelow, the present invention attempts to ignore the affects of the light when matching the color of the object to the color which will be printed.

For ease of discussion, numbers below 100 are in FIG. 1 and numbers above 100 are in FIG. 2.

A calorimeter 12 is utilized to characterize the color response of a printing press (not shown). An example of a suitable colorimeter is the CHROMA METER CS-100 manufactured by Minolta Camera Co. Ltd. of Osaka, Japan and operative in conjunction with the DP-100 data processor also manufactured by Minolta. The data processor is connectable to a workstation, such as the MACINTOSH, manufactured by Apple Corporation of the USA, using standard communication software, such as the SITCOMM Version 1.0 from Aladdin Systems of California, USA. Alternatively, other color measuring devices can be utilized, such as a spectrophotometer.

To characterize the color response, the printing press first prints a page 14, known as a "color book" having rectangles 16 of different colors throughout the gamut of colors which the printing press can produce. The rectangles are represented to the printing press by the values of their ink colors, cyan, magenta, yellow (CMY). The colorimeter 12 scans the color book 14 and measures (step 100 of FIG. 2) the color value (under standard illumination) of each rectangle. The colorimeter 12 produces colorimetric values in terms of luminance, hue and saturation (LHS) values. From this, a table 102 is produced which relates the CMY value of a rectangle with its LHS value.

In parallel, the object or swatch of color 10 is first viewed under standard illumination 18 and the color of various locations on the object 10 are measured (step 104) by calorimeter 12 or by another colorimeter having the same characteristics.

The scene, labeled 20, is photographed and the photograph is scanned (step 22) to produce a digital image 24 of the scene. Alternatively, the scene is captured by a digital camera. The digital image 24 typically is digitally represented as an array of inking values, such as CMY values, and is stored in a color correction workstation 108, such as the WHISPER workstation manufactured by Scitex Corporation Ltd. of Herzlia, Israel. An alternative workstation is the MACINTOSH, manufactured by Apple Corporation of the USA.

In step 26, an operator at the workstation 108 produces (step 110) a mask 30 of the object 10 allowing the separation just of the area of the image 24 which shows the object 10, called herein the "object image". Exemplary masking software is the MASKCUTTER, manufactured by Scitex Corporation Ltd. It is assumed that the object image has a single "real" color. If the object, such as a dress, has many colors therein, the mask produces only those sections having a single color. The process described herein must be repeated for each color in the dress.

The following steps attempt to determine the "actual" hue of the object 10 and its corresponding inking values, such as CMY values, for the printing press on which the image is to be printed.

FIG. 3 illustrates the LHS color space. The vertical axis is luminance, the horizontal axis is saturation and the circular axis is hue. As one moves along the luminance axis, the color changes from dark to light, where dark is at the bottom of the axis. As one moves out from the luminance axis along the saturation axis, the colors get more intense in color (i.e. they change from greys to sharp colors). Finally, as one moves around the hue circular axis, the colors change (i.e. from red to green, etc.)

Applicant has realized that the "color" of an object is its hue at its highest saturation value and that the change of luminance of the object contributes significantly to the perception of shape in texture. To understand this concept, five points are marked on FIG. 3, points 1–5. Points 1 and 2 are of the same hue and luminance but of different saturation, points 1 and 5 are of the same luminance and saturation but of different hues and points 2, 3 and 4 are of the same hue and saturation but of different luminance. The colors are all different; however, the human eye considers point 3 to be a lighter shade of point 1, especially assuming that point 1 is the most saturated version of its hue. Point 2 is a duller shade of point 1. The line connecting points 2, 3 and 4 is perpendicular to the hue plane of points 1 and 5 and parallel to the luminance axis. Thus, the appearance of shape and texture will be maintained if the luminance values are changed in a smooth and moderate way.

Using the color book 102, the workstation 108 converts (step 112) the data of the object image from CMY space to LHS space. In steps 114 and 116, the workstation 108 determines the representative hue, luminance and saturation values of the object image and of the object color measurements, respectively, as described in more detail hereinbelow. In general, the representative LHS values represent the "actual" color of the object, ignoring the effects of the fall of light within the scene.

Using the color book 102 once again, the representative LHS values of the object image and of the color measurements are converted (steps 118 and 120, respectively) to inking values, labeled CMYb and CMYa, respectively. The workstation 108 produces (step 124) smooth color correction functions which convert colors in the vicinity (in color space) of CMYb to colors in the vicinity (also in color space) of CMYa. The color correction functions attempt to change the basic color of the image while not changing the affects of highlight and shadow and of light and shadow by the following: not changing the white and dark points of the image, smoothly changing the luminance and optionally maintaining the same luminance for CMYa and for CMYb.

To achieve rapid image processing, there is one color correction function per color separation, for example, fc(cyan_in_the_image), fm(magenta_in_the_image) and fy(yellow_in_the_image). Each function fi attempts to leave the minimum and maximum values (white and dark points) unchanged (e.g. fi(minimum)=minimum and fi(maximum)=maximum), while affecting the desired change on some value in between (e.g. fc($cyan_b$)=$cyan_a$, fm($magenta_b$)=$magenta_a$ and fy($yellow_b$)=$yellow_a$), all in a smooth fashion.

FIG. 4 illustrates an exemplary, one-dimensional color conversion function fc(C) for the cyan separation. The ordinate provides the input cyan value, from the object image and the abscissa provides the replacement cyan value. The curve 212 illustrates a curve of no change, where the input value equals the output value. The curve 210 illustrates an exemplary curve fc(C) which does not change the values near the minimum and maximum input cyan values but does change the values in the color vicinity of $cyan_b$. In fact, for the input value of $cyan_b$, the replacement value is $cyan_a$, as it should be.

Appendix A, hereinbelow, provides source code in the C language for the method of the present invention and, in particular, describes how the functions fi are produced. The program of Appendix A is to be run on a MACINTOSH computer. Appendix A therefore also includes exemplary resource files for use during its execution.

It is noted that, by changing the colors in the vicinity (in color space) of the representative color, the affects of light and shadow in the image 24 are not significantly changed.

By applying (step 126) the functions fc, fm and fy on the image 24 under mask 30, the colors of the object image are corrected to match the "real" color of the object 10. When the image 24 is printed (step 38) on the printing press for whom the color book 14 was generated, a hard copy 40 picture is produced in which the printed color for object 10 should match that of the object 10 itself, under standard illumination (18) arrangements.

Figure 5A:
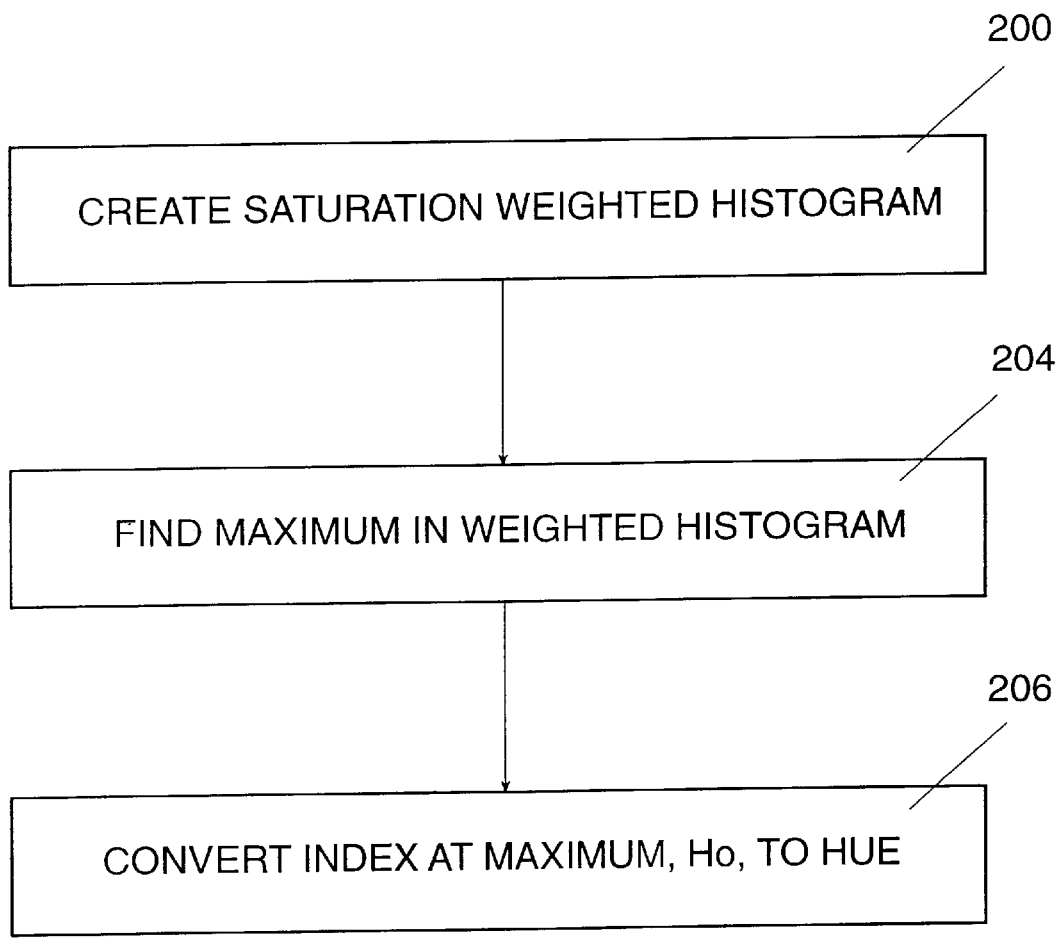
FIG. 5A is a flow chart illustration of a method for determining representative hue, useful in the method of FIG. 2.
Figure 5B:
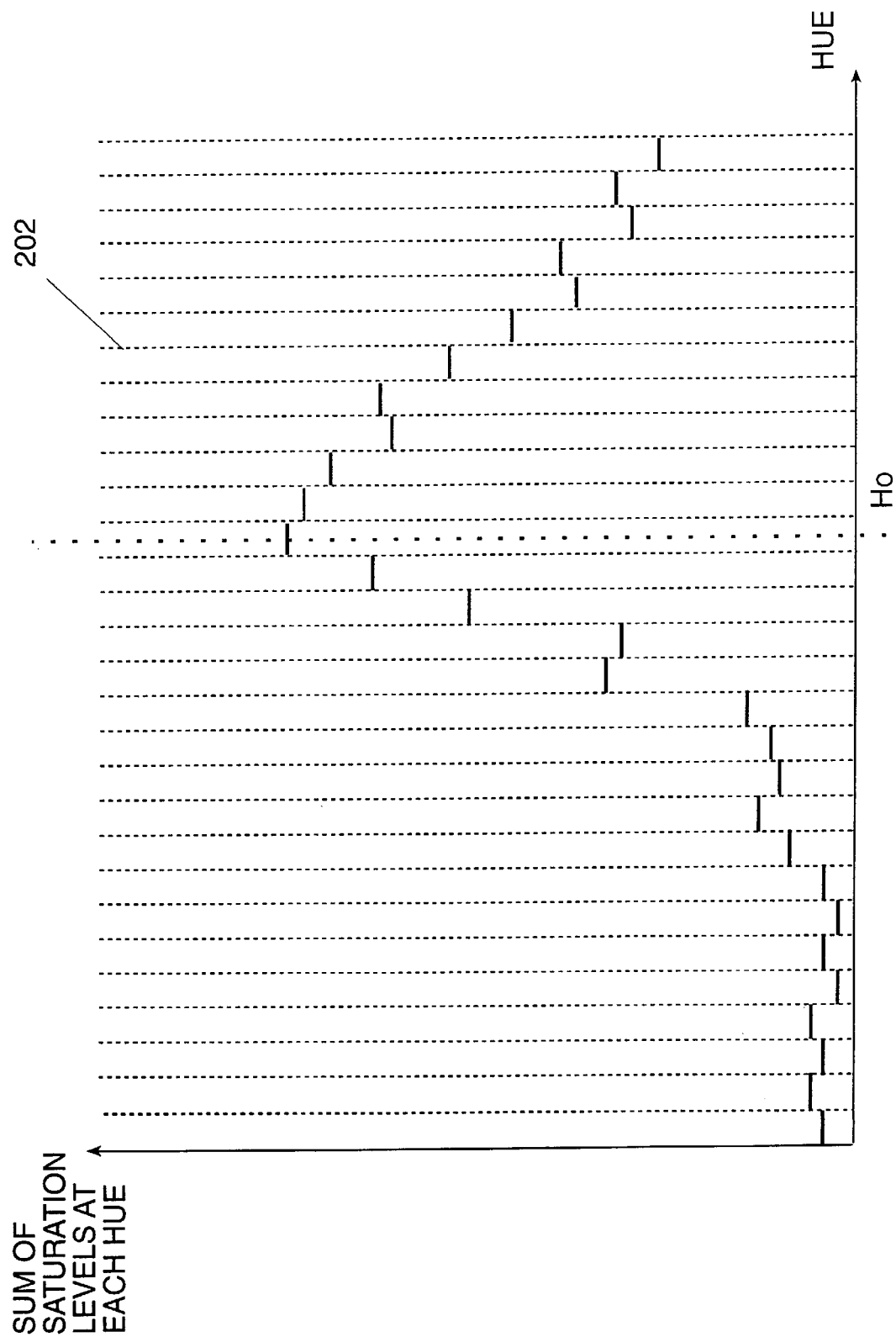
FIG. 5B is a graphical illustration of a saturation weighted histogram useful in understanding the method of FIG. 5A.

FIGS. 5A and 5B illustrate the process by which the LHS value for the color of the object is determined (i.e. they detail steps 114 and 116). Specifically, FIGS. 5A and 5B illustrate the determination of the hue value $H_o$.

In step 200 (FIG. 5A), a saturation weighted histogram, as shown in FIG. 5B, is determined from the LHS pixels in the object image. Each point of the histogram of FIG. 5B provides the sum of the saturation levels of the pixels which have that hue. Thus, there might be three pixels having LHS values of (10,10,3), (16,10,7) and (3,10,20). All three have the same hue values 10 but their saturation levels are different. The point in the histogram corresponding to hue=10 will be 3+7+20=30. The maximum point 202 is at the hue which collected the most saturation values.

In step 204, the maximum point 202 is determined. First a weight is determined, such as:

$$W_{i,j} = \frac{1}{1 + (H_i - H_j)^2} \quad (1)$$

Then, the maximum point is determined. For example, the maximum point might be the one which fulfills the following criterion:

"find a hue index j such that the sum on all table entries i of:

$$S_i * W_{ij} \quad (2)$$

is a maximum."

In step 206, the index j which satisfies the criterion is taken as hue $H_o$.

With the representative hue $H_o$ determined, the corresponding saturation and luminance must be determined. Ideally, the saturation level should be close to the saturation level at which the representative hue was determined. Therefore, the representative saturation level $S_o$ is determined by:

$$S_o = \left[ \frac{\sum_i S_i^q W_{i,o}}{\sum_i W_{i,o}} \right]^{\frac{1}{q}} \quad (3)$$

where q is any number, typically between 2 and 8, which indicates how close the saturation level should be to the maximum saturation value S.

The representative luminance level is not restricted to being close the maximum luminance level. Thus, the equation for the representative luminance level $L_o$ is:

$$L_o = \frac{\sum_i L_i W_{i,o}}{\sum_i W_{i,o}} \quad (4)$$

It will be appreciated by persons skilled in the art that the present invention is not limited to what has been particularly shown and described hereinabove. Rather the scope of the present invention is defined by the claims which follow:

nt.π                                                                                                          Page 1
sday, 6 June 1995   08:19

| File Name | Code | Data | Jump | Last Saved |
|---|---|---|---|---|
| ctif.c | 1268 | 762 | 40 | 13/06/94 08:51:35 |
| Fmodelk.C | 5340 | 9374 | 32 | 04/05/94 09:41:12 |
| obHiv.c | 1200 | 1722 | 40 | 10/07/94 16:21:54 |
| Parser.C | 326 | 2 | 24 | 21/04/94 08:24:06 |
| Simply.C | 6108 | 938 | 32 | 21/08/94 10:41:08 |
| swmt.c | 9812 | 2882 | 40 | 21/08/94 10:33:03 |
| Swmtdt.C | 7766 | 1110 | 104 | 04/08/94 16:31:21 |
| Swmtui.C | 388 | 304 | 40 | 29/05/94 15:24:59 |
| Segment 2 | 32208 | 17094 | 352 | |
| MacTraps | 7026 | 206 | 2224 | 18/08/94 11:02:56 |
| MacTraps2 | 4024 | 0 | 656 | 14/08/94 10:25:44 |
| Segment 3 | 11050 | 206 | 2880 | |
| ANSI | 28282 | 3048 | 1544 | 11/08/94 15:46:46 |
| Segment 4 | 28282 | 3048 | 1544 | |
| Project Totals | 99822 | 23396 | 6320 | |

Hardisk:...:SWMT:obHiv.c                                      Page 1
Sunday, 10 July 1994   4:21 PM

```c
#include <math.h>
#include "fwp.h"
static   char     MyName[MAX_REMARK]="Hiv";
static   char     MyTab[MAX_REMARK]="\n<h>";

#define HIVMAX   360
#define LOOPHIV(i)   for((i)=0;(i)<360;(i)++)
static   float    Hiv[HIVMAX];
static   short    MaxHue;
static   double   SumSat,SumLum,SumNof;

ty_stt   initHiv()    /*
--------======-- */
{
// Hiv[all]=0
    short  i;
    ty_stt stt=STT_OK;
    LOOPHIV(i)   Hiv[i]=0.00;
    SumSat=SumLum=SumNof=0.00;
    return(stt);
}
ty_stt   updateHiv(float lhs[DIM3])   /*
--------===================--- */
{
// Hiv[H]+=S
  ty_stt stt=STT_OK;
  short ihi = lhs[1];
  if(ihi<0 || ihi>=360) return(STT_FAIL);
  Hiv[ihi]+=lhs[2];
  return(stt);
} static   double   FactPower=10.;

ty_stt   sumHiv(float lhs[DIM3])   /*
--------===================- */
{
// if max hue accumulate lum, sat
  ty_stt stt=STT_OK;
```

Hardisk:...:SWMT:obHiv.c　　　　　　　　　　　　　　　　　　　　　　　　　　　Page 2
Sunday, 10 July 1994  4:21 PM

```
    double w = lhs[1]-MaxHue ;
    w = 1./(1.+w*w);

SumNof += w;
    SumLum += w*lhs[0];
    SumSat += w*pow((double)lhs[2], FactPower);

{
    // Watch Dog
    //
       float wd_l=SumLum/SumNof;
       if(wd_l<0. || wd_l>100.)    print_watch_dog("Hiv: problem with L.");
    ////////////
    } return(stt);
} ty_stt   getHiv(float lhs[DIM3])    /*
---------=================----- */
{
    lhs[0]= SumLum/SumNof ;
    lhs[1]= MaxHue;
    lhs[2]= pow(SumSat/SumNof, 1./FactPower );
    return(STT_OK);
} ty_stt   anaHiv()    /*
---------=========---- */
{
// what H has max S ?
  ty_stt stt=STT_OK;
  short  i;
  float max=0.00;
  LOOPHIV(i)
  {
    short register j;
    float sum=0.00;
    LOOPHIV(j)
```

17

Hardisk:...:SWMT:obHiv.c  Page 3
Sunday, 10 July 1994  4:21 PM

```
        {
            register float f = Hiv[j]/(1.+((float)i-(float)j)*((float)i-(float)j));
            sum+=f;
        }
        if(sum>max)
        {
            max=sum;
            MaxHue=i;
        }
    }
    return(stt);
}
```

```
ctif.c                                                              Page 1
Monday, 13 June 1994  08:51

// CT Inteface by Yoav Bresler 24/4/94
// limited to MAXWIDTH and 4 sep.'s Scitex CT on Mac
//////////////////////////////////////////////////////////////////// include <Files.h>
include <StandardFile.h>
include <events.h> include "fwp.h"
static   char    MyName[MAX_REMARK]="ctif";
static   char    MyTab[MAX_REMARK]="\n<CT>";

#define HEADERSIZE   2048
#define MAXWIDTH     10000

/**********************************************************************/ static   ty_stt FlOpen(short *RefNum )
{
  SFReply   tr;
  short rc;
  Point where;

where.h=100; where.v=50;     /* where the  Standard File dialog window goes */

SFGetFile( where, "\pSelect a file", 0, -1, 0, 0, &tr );

if ( tr.good ) rc = FSOpen( tr.fName, tr.vRefNum, RefNum );
  else return(STT_FAIL);

return (STT_OK);
}

/**********************************************************************/ extern   ty_pr Pr;

static long ascii_to_long (char *the_buf) /*
-------------================------------ */
{
/*. convert ascii string to long integer */
   long value=0,sign=1;

the_buf++;
   while (*the_buf >= '0' && *the_buf <= '9')
     {
          value = 10 * value + *the_buf - '0';
```

```
ctif.c                                                               Page 2
Monday, 13 June 1994  08:51 the_buf++;
    }
    return(value);
} static ty_stt   getCTpars(short filenum, CTpars_tp ctp ) /*
------------------======================================------ */
{
/*. fill ctp with parameters read from Scitex CT file */
    char *buf;
    short excep;
    long read_size = HEADERSIZE;
    buf = NewPtr( read_size );
    if(excep = FSRead(filenum, &read_size, buf ) )
    {
        DisposPtr(buf);
        PERR__ "Failed to read CT header, excep=%d",excep __PERR
    }
    if(read_size!=HEADERSIZE)
    {
        DisposPtr(buf);
        PERR__ "The file is too short to be a CT, read only %ld",read_size __PERR
    }
    ctp->w = ascii_to_long(&buf[1024+44]);
    ctp->h = ascii_to_long(&buf[1024+32]);
    ctp->s = buf[1024+1];
    if(ctp->w<0 || ctp->w>MAXWIDTH)
    {
        DisposPtr(buf);
        PERR__ "Sorry, can read only up to %ld pixels in a line, and the file has %ld"
               (long)MAXWIDTH, ctp->w __PERR
    }
    if(ctp->s != 4)
    {
        DisposPtr(buf);
        PERR__ "Sorry can handle only 4 sep. files, this one has %d", ctp->s __PERR
    }
    /* Round up to the closest even number */
    ctp->w1 = ctp->w + ctp->w % 2;
    ctp->h1 = ctp->h + ctp->h % 2;

DisposPtr(buf);
    return(STT_OK);
} ty_stt  resetCTdata(short refnum)
{
/* start at the beginning of data, after the header */
    long headeroffset = HEADERSIZE;
    short excep;

if( excep= SetFPos(refnum, fsFromStart, headeroffset) )
    {
```

```
ctif.c                                                              Page 3
Monday, 13 June 1994   08:51 closeCT(refnum);
        PERR__ "failed to SetFPos to start of data, excep=%d",excep __PERR
    }
    return(STT_OK);
} ty_stt  openCTfile(short *prefnum, CTpars_tp ctp) /*
---------========================================- */
{
/*. ask user for name, open existing, get parameters, prepare to read data */ short excep;

if( FlOpen( prefnum ) ) PERR__ "failed to open file." __PERR
    if( getCTpars(*prefnum,ctp) )
    {
        closeCT(*prefnum);
        return(STT_FAIL);
    }

CHECK( resetCTdata(*prefnum) )

return(STT_OK);
} ty_stt closeCT(short refnum) /*
---------==================- */
{
    if( FSClose (refnum) == noErr)  return(STT_OK);
    PRT__(Pr.error) "Failed to close CT file" __PR
    return(STT_FAIL);
} ty_stt  processCTline(short refnum, long read_size, unsigned char *buf, long line)   /
---------=========================================================================---
{
  long  filePos;
  short excep;

if( excep = GetFPos(refnum, &filePos) )                               PERR__
    "Failed to SetFPos before read, line=%ld, excep=%d", line, excep    __PERR
  if( excep = FSRead(refnum, &read_size, buf ) )                    PRT__(Pr.progress)
    "excep=%d at FSRead, line=%ld, read_size=%ld",excep,line,read_size __PR CHECK( changebuf(buf,read_size,line) )

if( excep = SetFPos(refnum, fsFromStart, filePos) )                   PERR__
    "Failed to SetFPos before write, line=%ld, excep=%d", line, excep   __PERR
  if( excep = FSWrite(refnum, &read_size, buf ) )                       PERR__
    "Failed to FSWrite, line=%ld, excep=%d", line, excep                __PERR
  return(STT_OK);
}
```

```
ctif.c                                                                  Page 4
Monday, 13 June 1994  08:51 ty_stt  writeonlyCTline(short refnum, long read_size, unsigned char *buf, long line)
--------=============================================================================---
{
  short excep;

CHECK( changebuf(buf,read_size,line) )

if( excep = FSWrite(refnum, &read_size, buf ) )                   PERR__
    "Failed to FSWrite only, line=%ld, excep=%d", line, excep        __PERR
  return(STT_OK);
} ty_stt  readonlyCTline(short refnum, long read_size, unsigned char *buf, long line)
--------============================================================================---
{
  long  filePos;
  short excep;

if( excep = FSRead(refnum, &read_size, buf ) )            PRT__(Pr.progress)
    "excep=%d at FSRead, line=%ld, read_size=%ld",excep,line,read_size  __PR CHECK( changebuf(buf,read_size,line) )

return(STT_OK);
}
```

```
Fmodelk.C                                                                   Page 1
Wednesday, 4 May 1994  09:41

/*.bs Header*/
/* version: with fwp.h, 4d only     13/7/90
 * fast, with prepareGrid()
 * changes towards uniting 3d abd 4d
 * and changes to make Coef bigger than 64K
 * and changes to speed things up
 * and changes in calling useApprox to give all cyan together
 *
 * 2/2/94 for swmt
 */
/*.be Header*/ include <stdlib.h>
/*.bs declarations, static variables*/
define VAX_NOT_PRISMA include "fwp.h"
static   char    MyName[MAX_REMARK]="fModelk";
static   char    MyTab[MAX_REMARK]="\n\t<M> ";

include <math.h> define MAXOUTDATSIZE 33
define MAXDATSIZE 12
define MAXDIM     12 typedef short    *short_pt;  /* type of external lut */
typedef float    VEC2[MAXDIM] ;
typedef float    MAT2[MAXDIM][MAXDIM] ;
typedef float    VEC3[4][MAXDIM+3] ;

static   float Reci255  = 0.003921569 ; /* 1/255. */
static   short Dimens=4;
static   short DimFlg=1;     /* TRUE if Dimens>3, =4 , with black */
static   short outgrdsize[4] ; /* Grid on which the output is computed */
static   short Grdsize[4] ;  /* Grid size for c,m,y,b */
static   short Cmydim[4] ;   /* Dimension of basis in c,m,y,b */
static   VEC3  knots ;          /* Knots of c,m,y,b */
static   float Grd[4][MAXDATSIZE] ;  /* Sample points of data */
static   float gram[4][MAXDIM][MAXDIM] ; /* Gram matrix for c,m,y */
static   float bspl[4][MAXDIM][MAXOUTDATSIZE] ;
            /* ASSUME:  MAXOUTDATSIZE > MAXDATSIZE */ define COEF_(j,i)  ((Coef[j])[i])
typedef float       *coef_pt;
static   short      Dimo=4; /* 3 for Lab */
#define LOOP_DIMO(i)    for(i=0;i<Dimo;(i)++)
static   coef_pt    Coef[4]; /* Dimo */ define EXIT_ERR    return(STT_FAIL);

extern  ty_pr   Pr; /* controls printouts */
/*.be declarations, static variables*/
```

```
Fmodelk.C                                                          Page 2
Wednesday, 4 May 1994   09:41

/*.bs local routines*/
static  unsigned indof(cmyb)        short cmyb[4];   /*
---------------================---------------------- */
{
  short     i;
  unsigned       n;
  for( n=0, i=Dimens-1; i>=0; i--)
  {
    n *= Grdsize[i] ;
    n += cmyb[i] ;
  }
  return(n);
}
static  int alloc_coef()    /*
----------------=============---- */
{
  unsigned int   i,n;

for (i=0, n=1; i<Dimens; i++) n*=Grdsize[i];

LOOP_DIMO(i)
  {
    Coef[i]=malloc(n*sizeof(float));
    if(Coef[i]==NULL)
       PERR__ "Failed to allocate %d floats for Coef[%d]",n,i __PERR
  }
  return(0);
}
/*ent*/ int freeApprox()    /*
-------------------============---- */
{
  unsigned int   i;

LOOP_DIMO(i)
  {
    if(Coef[i]!=NULL)    free(Coef[i]);
    Coef[i]=NULL;
  }
  return(0);
}
/*.bs Cholesky (a,x,b,dim)*/
/************************************************************
             Cholesky (a,x,b,dim)
             --------------------
Solves the linear equation  a * x = b. a[dim][dim] is a symmetric positive
definite matrix. x[dim] is a vector of unknowns and b[dim] is a known vector.
a,b are input parameters while x is an output parameter.
The solution is done in 3 stages :
1. Factorization a = l * lt wher lt is the transpose matrix of l.
2. Solution of l * y = b by forword substitution.
3. Solution of lt * x = y by backword substituion.
```

24

```
Fmodelk.C                                                                Page 3
Wednesday,  4 May 1994   09:41

*********************************************************/
static  void    Cholesky (a,b,x,dim)    /*
---------------=====================---- */
  MAT2 a ;
  VEC2 b,x ;
{
  MAT2 l;
  float val ;
  short i,j,p ;
/*
 * FACTORIZATION OF A TO L * LT
 */
  for (i=0;i<dim;i++)   /* i IS ROW INDEX */
  for (j=0;j<=i;j++)    /* j IS COL INDEX */
  {
    val = 0.0 ;
    if (i==j)
    {
      for (p=0;p<j;p++)     val += l[j][p] * l[j][p] ;
      l[j][j] = sqrt(a[j][j] - val) ;
    }
    else  /* i > j */
    {
      for (p=0;p<j;p++)         val += l[i][p] * l[j][p] ;
      l[i][j] = (a[i][j] - val) / l[j][j] ;
    }
  }
/*
 * SOLUTION OF L * Y = B , BY FORWARD SUBSTITUTION
 */
  for (i=0;i<dim;i++)
  {
    val = 0.0 ;
    for (j=0;j<i;j++)    val += x[j] * l[i][j] ;
    x[i] = (b[i] -val) / l[i][i] ;
  }
/*
 * SOLUTION OF LT * X = Y , BY BACKWARD SUBSTITUTION
 */
  for (i=dim-1;i>=0;i--)
  {
    val = 0.0 ;
    for (j=i+1;j<dim;j++)    val += x[j] * l[j][i] ;
    x[i] = (x[i] -val) / l[i][i] ;
  }
}
/*.be Cholesky (a,x,b,dim)*/
/*.bs Evalb (x,b,i,k,dim)*/
/***********************************************************
            Evalb (x,b,i,k,dim)
            -------------------
Evaluates B-spline at point x , and returns its value.
```

```
Fmodelk.C                                                                Page 4
Wednesday, 4 May 1994  09:41

The Bspline is evaluated via recursion formulas.
Input params:
  x - The point in which function is evaluated.
  b - Vector of knots with multiplicity on the edges.
  i - The requested Bspline is number i. This Bspline leans on b[i] to b[i+k].
  k - Order of requested Bspline. For example linear is 2.
  dim - Basis dimension.
*********************************************************/ static  double  Evalb (x,b,i,k,dim) /*
----------------=====================----- */
  double x ;
  float  b[MAXDIM+3];
  short  i,k,dim;
{
  if      (x<b[i])    return(0.0) ;
  else if (b[i+k]<x)    return(0.0) ;
  else if ((k==1) && (x==b[i+1]))
  {
    if (i==dim-1)   return(1.0) ; /* THE RIGHMOST BSPLINE IS EXCEPTIONAL. */
    else            return(0.0) ;
  }
  else if (k==1)    return (1.0) ;
  else                      /* K > 1 , START RECURSION */
  {
    float s1,s2;

if(b[i]<b[i+k-1])   s1 = ((x-b[i])/(b[i+k-1]-b[i])) * Evalb(x,b,i,k-1,dim);
    else                s1 = 0.0 ;
    if(b[i+1]<b[i+k])   s2 = ((b[i+k]-x)/(b[i+k]-b[i+1])) * Evalb(x,b,i+1,k-1,dim);
    else                s2 = 0.0 ;
    return (s1 + s2) ;
  }
}
/*.be Evalb (x,b,i,k,dim)*/
static  void    SetKnots(ndl)   short_pt ndl[4]; /*
----------------============---------------------- */
{
  short     i,j,l,cmyb[4];
  unsigned  coefi;
/*
 * BASIS DIMENSION ON EACH AXIS
 */
  for (l=0;l<4;l++) Cmydim[l] = Grdsize[l] ;
/*
 * EXTERIOR KNOTS
 */
  for (l=0;l<Dimens;l++)
    for (i=0;i<3;i++)
    {
      knots[l][i]           = 0.0 ;
      knots[l][Cmydim[l]+i] = 1.0 ;
    }
```

```
Fmodelk.C                                                                Page 5
Wednesday, 4 May 1994  09:41

/*
 * INTERIOR KNOTS
 */
  for (l=0;l<Dimens;l++)
    for (i=3;i<Cmydim[l];i++)   knots[l][i] = (Grd[l][i-2]+Grd[l][i-1]) / 2.0 ;
/*
 * FILL TABLE OF B-SPLINES ON DATA
 */
  for (l=0;l<Dimens;l++)
    for (i=0;i<Cmydim[l];i++)
      for (j=0;j<Grdsize[l];j++)
        bspl[l][i][j] = Evalb((double)Grd[l][j],knots[l],i,3,Cmydim[l]) ;

for (l=0;l<Dimens;l++)
  {
  /*. CREATE GRAM MATRIX (Cy, Mg, Yl (,Bk) ) */
    for (i=0;i<Cmydim[l];i++)
    {
    /*. COMPUTE GRAM[L,I,J] */
      for (j=0;j<=i;j++)
      {
      /*. INNER PRODUCT OF I AND J BSPLINES */
        short k;
        float val=0.0;
        for (k=0;k<Grdsize[l];k++) val+= bspl[l][i][k] * bspl[l][j][k] ;
        gram[l][i][j] = gram[l][j][i] = val ;
      }
    }
  }
  if(Pr.bar)
  {
    int is;
    unsigned long n=1;
    for(i=0;i<4;i++)    n*=Cmydim[i];
  } for (coefi=cmyb[3]=0; cmyb[3]<Cmydim[3]; cmyb[3]++)    /* loop once in 3d */
  for (       cmyb[2]=0; cmyb[2]<Cmydim[2]; cmyb[2]++)
  for (       cmyb[1]=0; cmyb[1]<Cmydim[1]; cmyb[1]++)
  for (       cmyb[0]=0; cmyb[0]<Cmydim[0]; cmyb[0]++, coefi++)
  {
  /*. CREATE INNER PRODUCT WITH THE BASIS */
    int     icy,img,iyl,ibk;
    unsigned index;
    float   v[4];
    printer();
    LOOP_DIMO(l)    v[l] = 0.0 ;

for (index=ibk=0; ibk<Grdsize[3]; ibk++)  /* only once at 3d */
    for (       iyl=0; iyl<Grdsize[2]; iyl++)
    for (       img=0; img<Grdsize[1]; img++)
    for (       icy=0; icy<Grdsize[0]; icy++, index++)
    {
```

```
Fmodelk.C                                                            Page 6
Wednesday,  4 May 1994  09:41 float register temp = Reci255 ;    /* = 1./255. */
      temp *= bspl[0][cmyb[0]][icy] ;
      temp *= bspl[1][cmyb[1]][img] ;
      temp *= bspl[2][cmyb[2]][iyl] ;
      if(DimFlg)    temp *= bspl[3][cmyb[3]][ibk] ;
      if(temp!=0.0)
      {
        short register is;
        LOOP_DIMO(is)  v[is] += temp * (float)(ndl[is][index]) ;
      }
     }
     LOOP_DIMO(l)  COEF_(l,coefi)=v[l];
   }
}
/*.bs LeastSquare*/
/*************************************************************
                LeastSquare()
                ------------
Solves leastsquare equqtion in 3 stages.
The result is stored in Coef.
**************************************************************/ static  void    LeastSquare()   /*
-----------------=============---- */
{
  short fout;
  LOOP_DIMO(fout)
  {
  /*. OUTPUT FUNCTIONS */
    short stage;
    for ( stage=0; stage<Dimens; stage++ )
    {
       short    cmyb[4],dimcmy[4],i;

for (i=0;i<4;i++) dimcmy[i]=Cmydim[i];      /* a temporary copy... */
       dimcmy[stage]=1;                            /* ...with one difference */ for (cmyb[3]=0; cmyb[3]<dimcmy[3]; cmyb[3]++)  /* loop once in 3d */
       for (cmyb[2]=0; cmyb[2]<dimcmy[2]; cmyb[2]++)  /* loop once if = stage */
       for (cmyb[1]=0; cmyb[1]<dimcmy[1]; cmyb[1]++)
       for (cmyb[0]=0; cmyb[0]<dimcmy[0]; cmyb[0]++)
       {
      short    ics,icmy[4];              /* ics is icmy[stage] */
         unsigned  coefi[MAXDIM];
         float     r[MAXDIM],x[MAXDIM];

for (i=0;i<Dimens;i++) icmy[i]=cmyb[i];   /* a temporary copy... */ for (ics=0; ics<Cmydim[stage]; ics++)
    {
      icmy[stage] = ics;                    /* ...with one difference */
      coefi[ics]  = indof(icmy) ;           /* 1d index of 4 or 3d */
```

28

Fmodelk.C
Wednesday, 4 May 1994  09:41                                          Page 7

```
          r[ics] = COEF_(fout,coefi[ics]);
        }
        Cholesky (gram[stage],r,x,Cmydim[stage]) ; /*SOLVE THE EQUATIONS  */ for (ics=0; ics<Cmydim[stage]; ics++)   COEF_(fout,coefi[ics])=x[ics];
      }
    }
  }
}
/*.be LeastSquare*/
/*.be local routines*/ int prepareApprox (nCMYB,gridCMYB,LUT_EXTRN)   /*
----==================================------ */
   short     nCMYB[4] ;
   short     gridCMYB[4][256] ;
   short_pt  LUT_EXTRN[4] ;
{
  short i,j;

for (i=0;i<4;i++) if((Grdsize[i]=nCMYB[i])>MAXDATSIZE)   EXIT_ERR
  if(nCMYB[3]==1)
  {
  /*. set to 3 dimensional */
    Dimens=3;
    DimFlg=0;
  } if(LUT_EXTRN[3]==NULL) Dimo=3;
  if(alloc_coef()) EXIT_ERR for (i=0;i<Dimens;i++)
  for (j=0;j<Grdsize[i];j++)    Grd[i][j] = gridCMYB[i][j]*Reci255 ;

SetKnots(LUT_EXTRN) ;
  LeastSquare() ;
  return(0) ;
}
int prepareGrid (length,outgrd)   /*
----===================------ */
  unsigned length[4] ;
  float    outgrd[MAXOUTDATSIZE][4] ;
{
  short i,j,l;
  for (l=0;l<4;l++)  outgrdsize[l] = length[l] ;

/* in fwp, to fill NDL : USUALLY OUTGRDSIZE[L] = 17, sometimes = 33 */ for (l=0;l<Dimens;l++)
  for (i=0;i<Cmydim[l];i++)
  for (j=0;j<outgrdsize[l];j++)
  {
```

```
Fmodelk.C                                                               Page 8
Wednesday, 4 May 1994  09:41 double  ftmp=outgrd[j][1]*Reci255;
    if      (ftmp>1.)   ftmp=1.;
    else if (ftmp<0.)   ftmp=0.;
    bspl[1][i][j] = Evalb(ftmp,knots[1],i,3,Cmydim[1]) ;
  }
  return(0) ;
}
int useApprox (CMYBo,CMYBi)   /*
----=================------ */
  float CMYBo[4][33] ;
  short CMYBi[4] ;   /* dummy,Mg,Yl [,Bk] */
{
  int      icy,img,iyl,ibk,i,j ;
  unsigned    coefi,CmydimCyMg=Cmydim[1]*Cmydim[0];

printer();

LOOP_DIMO(j) for(i=0;i<outgrdsize[0];i++) CMYBo[j][i]=0.0;
/*YB:6/2/94                     j BUG!!!???!!!                           */ for (coefi=ibk=0; ibk<Cmydim[3]; ibk++)    /* loop once in 3d */
  {
/*. GetVal */
    float tbk;

if(DimFlg)
    {
      tbk = bspl[3][ibk][CMYBi[3]];
      if(tbk==0.0)  coefi += Cmydim[2]*CmydimCyMg;
    }
    else    tbk = 1.;
    for (iyl=0; iyl<Cmydim[2] && tbk!=0.0; iyl++)
    {
      float tyl = tbk * bspl[2][iyl][CMYBi[2]];
      if(tyl==0.0)  coefi += CmydimCyMg;
      else for (img=0; img<Cmydim[1]; img++)
      {
        float tmg = tyl * bspl[1][img][CMYBi[1]];
        if(tmg==0.0)    coefi += Cmydim[0];
        else for (icy=0; icy<Cmydim[0]; icy++, coefi++)
    {
          short jcy;
          for ( jcy=0; jcy<outgrdsize[0]; jcy++ )
          {
            float tcy = tmg * bspl[0][icy][jcy];
            if(tcy!=0.0)
        {
              int register is;
            LOOP_DIMO(is)  CMYBo[is][jcy]+=COEF_(is,coefi) * tcy ;
          }
    }
      }
    }
  }
```

30

```
Fmodelk.C
Wednesday, 4 May 1994  09:41                                                    Page 9

}
  }
  LOOP_DIMO(j) for (i=0; i<outgrdsize[j]; i++)  CMYBo[j][i] *= 255.0 ;
  return(0) ;
}
```

```
Parser.C                                                             Page 1
Thursday, 21 April 1994  08:24

/*
 * P A R S E R     Yoav Bresler
 *
 * INPUT: A string, INP, containing words, seperated by blanks.
 *    A vector of possiable commands, VIN, ends with "".
 * OUTPUT:A long word, OUT, in which each bit i is a flag
 *    flag =1 iff VIN[i] matches a word in INP.
 *
 * lower/upper case doesn't matter.
 *
 * Special Characters:
 *   *       The rest of this word is not important.
 *   %       This chracter is not important.
 *   , () / = ? \t    Equal space, can be used to seperate words. (but not \n)
 *
 */
#define FOUND       1
#define tolower(c)  ((c)|ToLowerBit)
static  char        ToLowerBit='a'-'A';
typedef char        *string;

parser(inp,vin,out)   /*
---------------------- */
string inp,vin[];
long   *out;
{
  short i,r;
  long mask;

for ( i=0, mask=1, *out=0 ; *vin[i] != '\0' ; i++ )
  {
    r = parse_one(inp,vin[i]);
    if ( r==FOUND ) *out += mask ;
    mask = mask << 1 ;
    if ( mask==1 ) return(-1);
  }
  return (0) ;
}
/*
*****************************************************************
*/
char    parser_space_char(inp) /*
------------------------------- */
  char inp;
{
  if ( inp == ','  || inp == '('  || inp == ')'  || inp == '='
     || inp == '/' || inp == '?'  || inp == '\t'
     ) inp = ' ';
  return(inp) ;
}
/*
*****************************************************************
*/
```

```
Parser.C                                                                  Page 2
Thursday, 21 April 1994  08:24 parse_one(inp,candidate) /*
----------------------   */
  string inp,candidate;
{
  string pchI,pchV;
  short   result;

pchI = inp ;                      /* begin at beg. of input string */
  for (;;)                          /* loop on input string          */
  {
    result = -1 ;                   /* result := not decided, yet    */
        pchV = candidate ;          /* begin at beg. of string to match */
        for (;;)
        {
        if ( *pchI == '*' ) return(FOUND);  /* special signl */
        if ( *pchV == '\0' )   return(result);
            if ( *pchI == '\0' )   return(result);
        if ( parser_space_char(*pchI) == ' ' )
        {
            pchI++;
            break;
        }
        if ( tolower(*pchI) == tolower(*pchV)
           || *pchI  == '%'        /* special signal */
           || *pchV  == '%' )                  /* special signal */
            {
            pchI++; pchV++;
            result = FOUND ;    /* A match was found     */
        }
        else
        {
            for (   pchI++ ;
                parser_space_char(*pchI) != ' '
                && *pchI != '\0' ;
                pchI++
                ) ;
            break ;
        }
    }
  }
}
```

```
Swmtui.C                                                                    Page 1
Sunday, 29 May 1994  15:24

/***********************************************************************
 *
 * User interface of swmt. Yoav Bresler
 *
 ***********************************************************************
 */
#include <Dialogs.h>
#include    "fwp.h"

static  char    MyName[MAX_REMARK]="u.i/f";
static  char    MyTab[MAX_REMARK]="\n<u>";

extern  ty_pr   Pr;

#define ERROR_ALERT_ID  407
#define NIL_STRING  "\p"

/////////////////////////////////////////////
//
// WATCH DOG FOR DEBUGGING
// int WatchDog;
int set_watch_dog(int num)
{
  int old = WatchDog;
  WatchDog=num;
  return(old);
}
int print_watch_dog(char *txt)
{
  printf("\n Watch Dog %d: %s", WatchDog, txt);
  return(0);
}
//
//
///////////////////////////////////////////// void ErrorString(Str255 error_str) /*
-----================------------------- */
{
    size_t  len=79;
    char    str[80];

short numberdrawn;
    ParamText(error_str, NIL_STRING, NIL_STRING, NIL_STRING);
    InitCursor();
    numberdrawn=StopAlert(ERROR_ALERT_ID, NULL);
    if(numberdrawn<0)
    {
      PR__(Pr.error) "Error (no ALRT):" __PR
      strncpy(str,error_str+1,len);
      if(error_str[0]<len) len=error_str[0];
```

```
Swmtui.C                                                                Page 2
Sunday, 29 May 1994   15:24 str[len]='\0';
      PR__(Pr.error) "'%s'",str __PR
    }
    return;
} void error_report(string t1, string t2)
{
  int i;
  Str255 str;
  char   txt[99];
  sprintf(txt,"%s at %s!",t1,t2);
  for(i=0;txt[i];i++)    str[i+1]=txt[i];
  str[0]=i;
  ErrorString(str);
  return;
} void  printer() /*
-------------========== */
{
  static int    j;
  static int    i;
  static string s[] = { "|","/","-","\\" };

if(++j>7 && Pr.progress)
  {
    j=0;

i = (++i) & 0x3 ;
    printf("\b%s",s[i]);
    FFLUSHOUT
  }
}
```

35

Simply.C
Sunday, 21 August 1994  10:41
Page 1

```
/***********************************************************************
 *                                                                      *
 *                      PRISMA   Prepress System                        *
 *                                                                      *
 * Copyright (c) 1985, SCITEX Corporation Ltd.                          *
 *              All Rights Reserved                                     *
 *                                                                      *
 *                                                                      *
 *          COLOR BOX - NDLUT  OPERATION .                              *
 *                                                                      *
 ***********************************************************************/
/*********************************************************************** o MODULE NAME: simply.c (simplex.c)

o VERSION NUMBER: a0.1 o DESCRIPTION:

functions:

o USE:  can handle many NDL's, Yoav & Merav, Mac o ORIGINAL PROGRAMMER: Yacov Pluda .

o INITIAL DATE:  5.2.39 o CORRECTIONS:

***********************************************************************/ include "fwp.h"
static   char    MyName[MAX_REMARK]="simply";
static   char    MyTab[MAX_REMARK]="\n<S>";
extern   ty_pr   Pr;

/*.be includes according to platform*/ define SEPS        16
define LASTSEP     4
define SEPSIZE     256 typedef short *s_pointer;

/* static values */
/*****************/

/* static values from lutif */
/* ------------------------ */
typedef struct {
    short           DimI ;
    short           Cublets ;
    short           MsbShift ;
```

Simply.C
Sunday, 21 August 1994 10:41

Page 2

```c
        short           LsbMask ;
        short           DimO ;
        short           ItemSize ;      /* item size in bytes */
        unsigned char   MsbVec[SEPSIZE] ;
        unsigned char   LsbVec[SEPSIZE] ;
        unsigned short  Ladd[SEPS] ;
        long            HalfValue ;
        short           Shift ;
        short           DimShift ;
        short           Zero[SEPS] ;
        short           *lut;
} ndl_t, *ndl_tp;

static  ndl_tp  vndl[10] = {NULL, NULL, NULL, NULL, NULL, NULL, NULL, NULL, NULL, NULL}
static  short   NBPF=4,FNBPF=16;
static  ty_i    Wh;

static  AddSimplexS (
        long            *Sum,           // inp. simplex calculation vector .
        s_pointer       Value0,         // inp.
        s_pointer       Value1,         // inp.
        short           Length )        // inp.
/************************************************************************
Purpose:    Do the simplex calculation Sum = Sum +(Value1-Value0) * Length .
            For items of short type only (16 bits value) .
*************************************************************************/
{
    register    short sep ;
    register    short x ;

for (sep=0 ; sep<vndl[Wh]->DimO ; sep++)
        {
/*      Sum[sep] += (Value1[sep] - Value0[sep]) * Length ;  */
        x  = Value1[sep] ;
        x -= Value0[sep] ;
        Sum[sep] += (long)x * Length ;
        }
    return ;
}

/*ent*/ ty_stt SimplexStop(ty_i n)     /*      unique to simply.c
------------------=============------ */
{
  if(vndl[n]==NULL)     PERR__ "asked to Stop Simplex twice!" __PERR DisposPtr(vndl[n]->lut);
  DisposPtr(vndl[n]);
  vndl[n]=NULL;

return(STT_OK);
}
```

37

```
Simply.C                                                                Page 3
Sunday, 21 August 1994  10:41 static void swap_words_parts(char *buffer, long count)
{
    long bytes_count = count - 1;
    long i;
    char temp;

for (i = 0; i < bytes_count; i += 2)
    {
        temp = buffer[i];
        buffer[i] = buffer[i+1];
        buffer[i+1] = temp;
    }
} define L3D_SIZE    5120L
typedef signed short    *bufl3d;

static  ty_stt  read_L3D(typ_fname lut_name)    /* unique to simply.c
-------------================-- */
{
    OSErr ferr;
    long index,addr,buf_size;
    short rgb[3],lutRefNum,vRefNum,i;
    bufl3d bufs[DIM4];
    Str255 VolName,fname;
    typ_fname bnames[2];

vndl[Wh]->DimI=3;
    vndl[Wh]->DimO=3;
    vndl[Wh]->Cublets=17;
    vndl[Wh]->MsbShift=4;
    vndl[Wh]->LsbMask=0x0f;
    vndl[Wh]->ItemSize=vndl[Wh]->DimO*sizeof(short);

buf_size=L3D_SIZE*sizeof(signed short);
    LOOP_DIM4(i)
    {
      if((bufs[i]=(signed short *)NewPtr(buf_size)) == NULL)
        PERR__ "failed to allocate L3D buf[%ld]",i __PERR
    } if((vndl[Wh]->lut=(short *)NewPtr((Size)vndl[Wh]->ItemSize*(Size)4913)) == NULL)
        PERR__ "failed to allocate C_NDL" __PERR for(i=0; lut_name[i]!='\0';i++)     fname[i+1]=lut_name[i];
    fname[0] = i;
    GetVol(VolName,&vRefNum);
    if(ferr=FSOpen(fname, vRefNum, &lutRefNum))
        PERR__ "Faild to Open file, error %d", ferr __PERR

38
```

Simply.C
Sunday, 21 August 1994  10:41                                                   Page 4

```
    if(ferr = FSRead(lutRefNum, &buf_size, (char *)bufs[Cy]))
        PERR__ "Failed to read file - error %d", ferr __PERR
    swap_words_parts((char *)bufs[Cy],buf_size);

if(ferr = SetFPos(lutRefNum,fsFromStart, 16384))
        PERR__ "Faild to set file position, error %d", ferr __PERR
    if(ferr = FSRead(lutRefNum, &buf_size, (char *)bufs[Mg]))
        PERR__ "Failed to read file - error %d", ferr __PERR
    swap_words_parts((char *) bufs[Mg],buf_size);

if(ferr = SetFPos(lutRefNum,fsFromStart, 32768))
        PERR__ "Faild to set file position, error %d", ferr __PERR
    if(ferr = FSRead(lutRefNum, &buf_size, (char *)bufs[Yl]))
        PERR__ "Failed to read file - error %d", ferr __PERR
    swap_words_parts((char *) bufs[Yl],buf_size);

if(ferr = SetFPos(lutRefNum,fsFromStart, 49152))
        PERR__ "Faild to set file position, error %d", ferr __PERR
    if(ferr = FSRead(lutRefNum, &buf_size, (char *)bufs[Bk]))
        PERR__ "Failed to read file - error %d", ferr __PERR
    swap_words_parts((char *) bufs[Bk],buf_size);

index=0;
    for(rgb[2]=0;rgb[2]<=256;rgb[2]+=16)
    for(rgb[1]=0;rgb[1]<=256;rgb[1]+=16)
    for(rgb[0]=0;rgb[0]<=256;rgb[0]+=16)
    {
        if((rgb[0]<255) && (rgb[1]<255) && (rgb[2]<255))
            addr = ((rgb[2]<<4) + (rgb[1]) + (rgb[0]>>4));
        else if((rgb[0]>=255) && (rgb[1]<255)  && (rgb[2]<255))
            addr = ((rgb[2]) + (rgb[1]>>4) + (4096));
        else if((rgb[1]>=255) && (rgb[0]<255)  && (rgb[2]<255))
            addr = ((rgb[2]) + (rgb[0]>>4) + (4352));
        else if((rgb[2]>=255) && (rgb[1]<255)  && (rgb[0]<255))
            addr = ((rgb[1]) + (rgb[0]>>4) + (4608));
        else if((rgb[0]>=255) && (rgb[1]>=255) && (rgb[2]<255))
            addr = ((rgb[2]>>4) + (4864));
        else if((rgb[0]>=255) && (rgb[2]>=255) && (rgb[1]<255))
            addr = ((rgb[1]>>4) + (4928));
        else if((rgb[2]>=255) && (rgb[1]>=255) && (rgb[0]<255))
            addr = ((rgb[0]>>4) + (4992));
        else addr = 5056;
        LOOP_DIM3(i)    vndl[Wh]->lut[index++] =(short)(bufs[i][addr]*16);
    }
    FSClose(lutRefNum);

LOOP_DIM4(i) DisposePtr(bufs[i]);

return(STT_OK);
}
```

Simply.C                                                              Page 5
Sunday, 21 August 1994 10:41

```
/*ent*/ ty_stt  SimplexStart(typ_data data, short grid, typ_i pwh, char *txt,typ_fname
-------------========------------------------------------------------- */
{
    short           sep ;
    Size            size;
//
//  allocate next free vndl [which?]
//
    for(Wh=0;Wh<10;Wh++)
    {
        if (vndl[Wh] != NULL )   continue;

if((vndl[Wh] = (ndl_tp)NewPtr(sizeof(ndl_t))) == NULL)
            PERR__ "Failed to allocate vndl[%d].",Wh __PERR break;

}
    if(Wh==10)  PERR__ "Sorry, can handle only 10 NDLs" __PERR
    *pwh=Wh;

if(data == NULL)    CHECK(read_L3D(fname))
    else
    {
//. fill in some parameters vndl[Wh]->DimI=3;    vndl[Wh]->DimO=3;

vndl[Wh]->Cublets=grid;
        if(grid==33)
        {
            /* 5:3 */
            vndl[Wh]->MsbShift=3;
            vndl[Wh]->LsbMask=0x7;
        }
        else if(grid==17)
        {
            /* 4:4 */
            vndl[Wh]->MsbShift=4;
            vndl[Wh]->LsbMask=0x0f;
        }
        else PERR__ "segmentation=%d?",grid __PERR
    }

NBPF=4;
    {
//. calculate FNBPF of NBPF
        ty_i register j;
        for(j=NBPF, FNBPF=1;  j>0;  j--)  FNBPF+=FNBPF;
    } for (sep=0 ; sep<SEPSIZE ; sep++)
```

40

Simply.C
Sunday, 21 August 1994 10:41

Page 6

```c
    {
    /*. same dimentions - create vectors for quick addresing */
        vndl[Wh]->MsbVec[sep] = sep >> vndl[Wh]->MsbShift ;
        vndl[Wh]->LsbVec[sep] = sep & vndl[Wh]->LsbMask ;
    } vndl[Wh]->Shift=vndl[Wh]->MsbShift;
    vndl[Wh]->DimShift = 1 << vndl[Wh]->Shift ;
    vndl[Wh]->Shift += NBPF ;
    vndl[Wh]->HalfValue = 1 << (vndl[Wh]->Shift-1) ;
    for (sep=0 ; sep<vndl[Wh]->DimI ; sep++)  vndl[Wh]->Zero[sep] = 0 ;

// create addition table for all cubes items address
    for (vndl[Wh]->Ladd[0]=vndl[Wh]->DimO, sep=1; sep<vndl[Wh]->DimI; sep++)
        vndl[Wh]->Ladd[sep] = vndl[Wh]->Ladd[sep-1] * vndl[Wh]->Cublets ;

if(data!=NULL)
    {
    //. allocate lut, calculating ItemSize and size
    //
        Size fullsize;
        ty_i register j;

vndl[Wh]->ItemSize = vndl[Wh]->DimO * sizeof(short);
        for(j=0, size=1; j<vndl[Wh]->DimI; j++ )    size*=vndl[Wh]->Cublets;
        fullsize = size * vndl[Wh]->ItemSize ;
        if((vndl[Wh]->lut=(short *)NewPtr(fullsize))==NULL)
            PERR__ "failed to allocate lut[%d]",Wh __PERR
    } if(data!=NULL)
    {
      PRT__(Pr.true) "Reading NDL data line --------" __PR

{
        //. fill NDL with data
        long  index,index2;

for(index=0,index2=0;index<size;index2++)
        {
        //. fill 3DL with data
            long offset;
            short lab[DIM3], cmyk[DIM4];
            float flab[DIM3];
            ty_i register j;
            ty_stt stt;

CHECK( be_nice() )

if(index%100==0) PR__(Pr.true) "\b\b\b\b\b\b\b%8ld",index __PR
            stt= get_Data(data,lab,cmyk,index2);
            if(stt!=STT_OK) PERR__ "incomplete data for NDL %d",Wh __PERR
```

41

Simply.C                                                                    Page 7
Sunday, 21 August 1994  10:41

```
            LOOP_DIM3(j) flab[j] = lab[j]/Integer_Factor;

if(!(isGridItself(flab)))
            {
            //. NDL[index] <- flab after some unit conversion
              if(txt[0]=='L')
              {
                 flab[0] = flab[0]*2.55;
                 flab[1] = flab[1]+127.;
                 flab[2] = flab[2]+127.;
              }
//          else: CMY vs. Lab file has CMY in correct sys.val. units for(  j=0, offset=index*vndl[Wh]->DimO;
                    j<vndl[Wh]->DimO;
                    j++
                 )  vndl[Wh]->lut[offset+j] = (short) (flab[j]*FNBPF) ;
                    index++;
            }//if isGridItself
         }//index loop
      }//fill NDL
      if(free_Data(&data) == STT_FAIL)    PERR__ "Faild To Free Data. " __PERR
   }//if not L3D
   return(STT_OK);
}
/*.be SimplexStart; SimplexStop*/

/**********************************************************************

SimplexOrder4
                        -------------

SimplexOrder4 (Lsb,Order)

Purpose:
        Get order list of Simplex items from incube address (Lsb) for 4D Lut .

Input:
     unsigned char   Lsb[]    - vector of incublets values to be addres in cube .

Output:
     unsigned char   Order[]  - vector of separation order for simplex .

**********************************************************************/ define F(x,y)      if(x<y)
define O(p)        OrderNum = p ;

static  ty_stt  SimplexOrder4 (Lsb,Order)
     unsigned char   Lsb[] ;
     unsigned char   Order[] ;
{
```

```
Simply.C                                                                    Page 8
Sunday, 21 August 1994  10:41 register        f0,f1,f2,f3 ;
        short           i,OrderNum ;
        static char     OrderList[24][4] =
        {
        /*. 24 combinations of 0,1,2,3  */
             3,2,1,0
            ,2,3,1,0
            ,3,1,2,0
            ,1,3,2,0
            ,2,1,3,0
            ,1,2,3,0
            ,3,2,0,1
            ,2,3,0,1
            ,3,0,2,1
            ,0,3,2,1
            ,2,0,3,1
            ,0,2,3,1
            ,3,1,0,2
            ,1,3,0,2
            ,3,0,1,2
            ,0,3,1,2
            ,1,0,3,2
            ,0,1,3,2
            ,2,1,0,3
            ,1,2,0,3
            ,2,0,1,3
            ,0,2,1,3
            ,1,0,2,3
            ,0,1,2,3
        };

f0 = Lsb[0] ;
        f1 = Lsb[1] ;
        f2 = Lsb[2] ;
        f3 = Lsb[3] ;

F(f0,f1)  F(f0,f2)  F(f0,f3)  F(f1,f2)  F(f1,f3)  F(f2,f3)  O( 0)
                                                          else      O( 1)
                                                else                O( 3)
                                      else      F(f1,f3)            O( 2)
                                                else      F(f2,f3)  O( 4)
                                                          else      O( 5)
                            else      F(f1,f2)                      O( 9)
                                      else                          O(11)
                  else      F(f0,f3)            F(f1,f3)            O( 8)
                                                else                O(10)
                            else                          F(f2,f3)  O(16)
                                                          else      O(17)
        else      F(f0,f2)  F(f0,f3)                      F(f2,f3)  O( 6)
                                                          else      O( 7)
                            else                F(f1,f3)            O(13)
                                      else                          O(15)
                  else      F(f0,f3)  F(f1,f2)                      O(12)
```

```
Simply.C                                                                    Page 9
Sunday, 21 August 1994  10:41 else                        O(14)
                        else     F(f1,f2)   F(f1,f3)   F(f2,f3)   O(18)
                                                       else       O(19)
                                           else                   O(21)
                                 else      F(f1,f3)               O(20)
                                           else       F(f2,f3)    O(22)
                                                      else        O(23)

LOOP_DIM4(i) Order[i]=(OrderList[OrderNum])[i] ;

return(STT_OK) ;

} static  ty_stt   SimplexOrder3 (lsb,order)
        unsigned char    lsb[] ;
        unsigned char    order[] ;
{
        register         f0,f1,f2 ;
        short            i,OrderNum ;
        static  char     OrderList[6][3] =
        {
        /*. 6 combinations of 0,1,2 */
            2,1,0  ,1,2,0 ,1,0,2,
            2,0,1  ,0,2,1 ,0,1,2
        };

f0 = lsb[0] ;
        f1 = lsb[1] ;
        f2 = lsb[2] ;

F(f0,f1)   F(f0,f2)   F(f1,f2)    O( 0)
                              else        O( 1)
                   else                   O( 2)
        else       F(f0,f2)               O( 3)
                   else       F(f1,f2)    O( 4)
                              else        O( 5)

LOOP_DIM4(i)     order[i]=(OrderList[OrderNum])[i] ;

return(STT_OK) ;

} static  Sort (unsigned char *Value, unsigned char *Order)          /*
--------================================================----------

Purpose:    Get order list of Simplex items from incube address (Lsb) .

Input:  unsigned char    Lsb[]    - vector of incublets values to be addres in cube .

Output: unsigned char    Order[]  - vector of separation order for simplex .
```

44

Simply.C                                                                Page 10
Sunday, 21 August 1994  10:41

--------------------------------------------------------------------*/
{
    short       i , last , change=TRUE ;
    unsigned char   temp ;

for (i=0 ; i<vndl[Wh]->DimI ; i++)  Order[i] = i ;

for (last=vndl[Wh]->DimI-1 ; (last>0)&&(change) ; last--)
    {
        change = FALSE ;
        for (i=0 ; i<last ; i++)
        {
            if (Value[Order[i+1]] < Value[Order[i]])
            {
                temp = Order[i] ;
                Order[i] = Order[i+1] ;
                Order[i+1] = temp ;
                change = TRUE ;
            }
        }
    } return(0) ;

}

/*ent*/ void Simplex(unsigned char *SepIn, unsigned char *SepOut,ty_i num)   /*
--------------=================================================-----

Purpose:    Get computed data of separations from data separations using Simplex .

Input:  unsigned char   SepIn[]  - input separation values .

Output: unsigned char   SepOut[] - return value of separations values .

--------------------------------------------------------------------*/
{
    unsigned char   msb[SEPS] ;
    unsigned char   lsb[SEPS] ;
    unsigned char   Order[SEPS] ;
    unsigned char   Length[SEPS] ;
    s_pointer       adr[SEPS] ;

{
    // SimplexSeps (unsigned char *SepIn, unsigned char *msb, unsigned char* lsb)
    // Purpose:    Divide separations values to msb (Cublet address) and lsb (Incuble
    // Input:  unsigned char   SepIn[] - Input separations values .
    // Output: unsigned char   msb[]   - Cublets addres .
    //         unsigned char   lsb[]   - In Cublet address .
    //////////////////////////////////////////////////////////////////////
        short   register            sep ;

45

Simply.C  
Sunday, 21 August 1994 10:41

Page 11

```
//      ASSUME never DifferntCublets !

Wh = num;
        for (sep=0 ; sep<vndl[Wh]->DimI ; sep++)
        {
            unsigned short register v = SepIn[sep] ;
            msb[sep] = vndl[Wh]->MsbVec[v] ;
            lsb[sep] = vndl[Wh]->LsbVec[v] ;
        }
    }
    {
//  SimplexOrder (unsigned char *lsb, unsigned char *Order)
//  Purpose:    Get order list of Simplex items from incube address (lsb) .
//  Input:  unsigned char   lsb[]   - vector of incublets values to be addres in c
//  Output: unsigned char   Order[] - vector of separation order for simplex .
/////////////////////////////////////////////////////////////////////////////// if      (vndl[Wh]->DimI == DIM3)    SimplexOrder3 (lsb,Order) ;    // deal wi
        else if (vndl[Wh]->DimI == DIM4)    SimplexOrder4 (lsb,Order) ;    // deal wi
        else                                Sort (lsb,Order) ;             // deal with any other

}

SimplexAdr (msb,lsb,Order,adr,Length) ;

{
//  SimplexValue (adr,Length,SepOut) - Get computed data from Simplex items .
//  Input:  pointer     adr[]   - address of items value input. size is DimI+1 !
//          unsigned char Length[] - In cublet address .
//  Output:unsigned char Out[]    - return value of separations values .

long            Sum[LASTSEP] ;
        short register  sep ;

for (sep=0 ; sep<vndl[Wh]->DimO ; sep++)         Sum[sep] = vndl[Wh]->HalfValue
//      ASSUM ValueSize==2 : NDL of shorts AddSimplexS (Sum , vndl[Wh]->Zero, adr[0] , Length[0]) ;

for(sep=1; sep<vndl[Wh]->DimI+1; sep++) AddSimplexS(Sum, adr[sep-1], adr[sep], for(sep=0; sep<vndl[Wh]->DimO; sep++)
        {
        /*. shift & trim to 00..FF */
            register short x;
            if (Sum[sep] < 0)                                        SepOut[sep] = 0 ;
            else if ((x = (Sum[sep] >> vndl[Wh]->Shift)) > 0xFF)     SepOut[sep] = 0xFF
            else                                                     SepOut[sep] = x ;
        }
    }
    return ;
```

Simply.C
Sunday, 21 August 1994   10:41
                                                                                Page 12

}

```c
static  ty_stt SimplexAdr ( // Get address of Simplex values items from cube address .
    unsigned char *imsb,    // inp. vector of cublets values to be addres in lut .
    unsigned char *ilsb,    // inp. vector of incublets values to be addres in lut .
    unsigned char *iorder,  // inp. vector of separation order for simplex .
    s_pointer     *oadr,    // out. address of items value output .
    unsigned char *olength ) // out. In cuublet address .
/////////////////////////////////////////////////////////////////////////////////
{
    short    sep ;
    long     offset;
    short    *lutadr ;

for (offset=0, sep=vndl[Wh]->DimI-1 ; sep>=0 ; sep--)
    {
        short register lutm = imsb[sep] ;
        if (lutm >= vndl[Wh]->Cublets)  return(STT_FAIL) ;
        offset = offset * vndl[Wh]->Cublets + lutm ;
    }
    offset*=vndl[Wh]->DimO;

/* first item address */
    /* ------------------ */
    oadr[0] = vndl[Wh]->lut + offset ;
    olength[0] = vndl[Wh]->DimShift ;

/* next items */
    /* ---------- */
    for (sep=0 ; sep<vndl[Wh]->DimI ; sep++)
    {
        register short i = iorder[sep] ;
        offset += vndl[Wh]->Ladd[i] ;
        oadr[sep+1] = vndl[Wh]->lut + offset ;
        olength[sep+1] = ilsb[i] ;
    } return(STT_OK) ;

}

/*new ent*/ int getCTofNDL(unsigned char out[DIM4], long h, long w,ty_i num)
{
// Used to stamp the NDL values on a CT file.
// Gets the CT h,w coordinates.
// Puts the CT color in 0..255,
// If output dimension is 3 then CT Bk is an EGA.
// Returns DimO when output CT color is indeed to be put on the CT, Negative when not
```

Simply.C
Sunday, 21 August 1994  10:41                                              Page 13

////////////////////////////////////////////////////////////////////////////////

```
  short cmyk[DIM4],i;
  long  offset;

Wh = num;
  if(vndl[Wh]->lut==NULL)    return(-1);
  if(vndl[Wh]->Cublets<=0)   return(-2);
  if(vndl[Wh]->DimO<=0)      return(-4);
  if(FNBPF<=0)         return(-5);

if(vndl[Wh]->DimI==4)
  {
    short cub2 = vndl[Wh]->Cublets * vndl[Wh]->Cublets ;
    if( w/cub2>0 || h/cub2>0)    return(-9);
  }
  else if(vndl[Wh]->DimI==3)
  {
    short cub2 = vndl[Wh]->Cublets * vndl[Wh]->Cublets ;
    if( w/cub2>0 || h/vndl[Wh]->Cublets>0)   return(-9);
  }
  else return(-3);

cmyk[Cy] = w % vndl[Wh]->Cublets ;
  cmyk[Mg] = h % vndl[Wh]->Cublets ;
  cmyk[Yl] = w / vndl[Wh]->Cublets ;
  cmyk[Bk] = h / vndl[Wh]->Cublets ;

for(i=vndl[Wh]->DimI-1, offset=0; i>=Cy; i--)
  {
    offset *= vndl[Wh]->Cublets;
    offset += cmyk[i];
  }
  LOOP_DIM4(i)
  {
    if(i<vndl[Wh]->DimO)    out[i] = vndl[Wh]->lut[vndl[Wh]->DimO*offset+i] / FNBPF ;
    else            out[i] = 255;
    if(out[i]<0)
    {
        out[i] = 0;
        if(vndl[Wh]->DimO<DIM4) out[Bk] = 0;
    }
    if(out[i]>255)
    {
        out[i] = 255;
        if(vndl[Wh]->DimO<DIM4) out[Bk] = 0;
    }
  }
  return(vndl[Wh]->DimO);
}
```

```
swmt.c                                                                    Page 1
Sunday, 21 August 1994  10:33

// Swatch Match
// Yoav Bresler
// SCITEX
// May 1994
//////////////////////////////////////////////////////////////////////////// include <events.h>
include <math.h>
#include <stdlib.h>
#include "fwp.h"
static  char    MyName[MAX_REMARK]="SwMt";
static  char    MyTab[MAX_REMARK]="\n<M>";
static  short   Pass;
static  ty_i    NDLis[2];

////////////////////////////////////////////////////////////////////////////
//
// Get Resources:
//
// 408 - Pr. parameters
//     - # sysv or # dotp Metered values
// 409 - 1 - NDL grid for CMY to Lab conversion
//     - 2 - Color Book file name for CMY to Lab
//     - 3 - Color Book file name for Lab to CMY
//
static  float       LHS_Metered[3];
ty_pr   Pr;
static  short       Metered[3],Power=100,Lfactor=100,NoMask=0,Skip[2]={0,0},OverShoot=
static  short       Skipped[2];
static  int doSkip(int wh)
{
    if(Skip[wh] && Pass<3)
    {
        if(Skipped[wh]) Skipped[wh]--;
        else            Skipped[wh]+=Skip[wh];
    }
    return((int)(Skipped[wh]));
}
static  void    resetSkip()
{
    Skipped[0]=Skipped[1]=0;
} define WR__    { char logtxt[256]; sprintf(logtxt,
define __WR    ); writelog(logtxt); }
static  FILE    *FPLog=NULL;
static  void    writelog(char *text)
{
    if(FPLog==NULL) return;
    fprintf(FPLog,"%s",text);
    return;
}
```

49

```
swmt.c                                                                    Page 2
Sunday, 21 August 1994  10:33 static  typ_fname   MeterFileName;
static  short       PrStrId=408, GrStrId=409;
static  char        GradWrite=0;

static  void    get_prs() /*
--------------------========- */
{
//. Fill Pr. and Metered
    short i;
    for(i=1;;i++)
    {
        Str255 prstring;
        GetIndString(prstring,PrStrId,i);
        if(prstring[0]==0)   return;
        switch(prstring[1])
        {
        //. Pr. flag or Metered value
        case 'b':   Pr.progress=1;  break;   // big progress
        case 'd':   Pr.debug=1;     break;
        case 'e':   Pr.error=1;     break;
        case 'g':   GradWrite=1;    break;
        case 'm':   Pr.map=1;       break;
        case 'n':   NoMask=1;       break;
        case 's':   Pr.prgrs=1;     break;   // small progress
        case 't':   Pr.true=1;      break;
        case 'w':   Pr.warning=1;   break;
        case '#':
          {
          //. of the form '# word numbers: '# sysv' or '# dotp'
            char  str[10];
            char  str2[20];
            short num[3];
            OSType *ost;
            prstring[prstring[0]+1]='\0'; // Pascal string to C string
            sscanf((char *)prstring+1,"%s %s %d %d %d",str, str2, num, num+1, num+2);
            ost=(OSType *)str2;
            switch(*ost)
            {
                        short s;
            case 'sysv':    LOOP_DIM3(s)    Metered[s]=num[s];          break;
            case 'dotp':    LOOP_DIM3(s)    Metered[s]=255-2.55*num[s]; break;
            case 'cons':    Power=num[0];   Lfactor=num[1];             break;
            case 'over':    OverShoot=num[0];
                            PRT__(Pr.progress) "Overshoot %d",OverShoot  __PR
                            break;
            case 'skip':    Skip[0]=num[0]; Skip[1]=num[1];
                            PRT__(Pr.progress) "skip w,h=%d,%d",Skip[0],Skip[1] __PR
                            break;
            default     :                                               break;
            }
          }
        default :                   break;
        }
```

```
swmt.c                                                                      Page 3
Sunday, 21 August 1994  10:33

}
} static ty_stt get_grid(typ_i grid)  /*
----------------------=============---------------- */
{
//. get NDL grid parameter resource
    Str255 prstring;
    short i=1;

GetIndString(prstring, GrStrId, i );
    if(prstring[0]==0)
       PERR__ "Failed to get resource %3d/%ld, NDL grid", GrStrId, i __PERR
    prstring[prstring[0]+1]='\0';    // Pascal string to C string
    sscanf((char *)prstring+1,"%d %d %d %d",grid,grid+1,grid+2,grid+3);
    PRT__(Pr.true) "NDL grid = %d %d %d %d", grid[0], grid[1], grid[2], grid[3] __PR return(STT_OK);
} ty_stt get_book_names(typ_fname names[2])   /*
----------------=============--------------------- */
{
//. get book file name resource
    short n;
    for(n=0;n<2;n++)
    {
        short i;
        Str255 prstring;

GetIndString(prstring, GrStrId, i=n+2 );
        if(prstring[0]==0)
        PERR__ "Failed to get resource %3d/%ld, color book data file name",
               GrStrId,i __PERR
        prstring[prstring[0]+1]='\0';      // Pascal string to C string
        sscanf((char *)prstring+1,"%s",names[n]);
        PRT__(Pr.true) "Color book %ld file name = %s", n,names[n] __PR
    }
    return(STT_OK);
} static ty_stt get_meter_file_name()          /*
----------------=========================-------- */
{
//. get NDL grid parameter resource
    Str255 prstring;
    short i=4;

GetIndString(prstring, GrStrId, i );
    if(prstring[0]==0)
       PERR__ "Failed to get resource %3d/%ld, meter file name", GrStrId, i __PERR
    prstring[prstring[0]+1]='\0';    // Pascal string to C string
    sscanf((char *)prstring+1,"%s", MeterFileName );
```

```
swmt.c                                                                    Page 4
Sunday, 21 August 1994  10:33

PRT__(Pr.true)   "MeterFileName = %s", MeterFileName __PR return(STT_OK);
} static  void    fill_grid(short gridData[DIM4][33], ty_i grid[DIM4])    /*
---------------========-------------------------------------------- */
{
    short i;
    LOOP_DIM3(i)
    {
        short j,k,step;
        step=256/grid[i];
        for(j=k=0;j<=256;j+=step)    gridData[i][k++]=j;
        if(grid[i] != 32) gridData[i][k]=-1;
    } return;
} static ty_stt getbooks(typ_data *pdat,typ_i gpar,typ_fname bnames[2])    /*
---------------=====---------------------------- */
{
//. get color book: CMY vs. Lab and inverse
    typ_data dat[2]={NULL,NULL};
    ty_i grid[DIM4];

short gridData[DIM4][33];
    short i,stt;

CHECK( get_grid(grid) )
    CHECK( get_book_names(bnames) )
    WR__ "\n LUT Files = %s, \n                      %s", bnames[0], bnames[1] __WR
    for(i=0;i<2;i++)
    {
    // return(STT_OK), if L3D is the file type
        ty_i j;
        Str255 fname,VolName;
        short vRefNum;
        FInfo fi;

for(j=0;  bnames[i][j] !='\0';j++)    fname[j+1]=bnames[i][j];
        fname[0] = j;

GetVol(VolName,&vRefNum);

GetFInfo(fname, vRefNum, &fi);
        if(fi.fdType=='STLU')        return(STT_OK);

// file of type 'STLU' is the binary 17x17x17 cmyk lut
        // if file is of type 'STLU', then don't try to convert grid, and *pdat remain
        // this NULL signals simply.c to read the binary 17x17x17 cmyk LUT.
```

```
swmt.c                                                                    Page 5
Sunday, 21 August 1994  10:33

// if any of the two files is of type 'STLU', then both are of this type.
     } for(i=0;i<2;i++)         CHECK( read_Data(bnames[i],dat+i) )
     fill_grid(gridData,grid);
     *gpar = grid[0]+1;
     for(i=0;i<2;i++)
     {
        if( gridoData(pdat+i,dat[i],gridData) == STT_FAIL)
          PERR__ "Failed To Convert Grid [%ld]. ",i __PERR
        if( free_Data(dat+i) == STT_FAIL)
          PERR__ "Faild To Free Data[%ld]. ",i __PERR
     } return(STT_OK);
}
//
// End of dealing with input parameters, resources, color books
//
//////////////////////////////////////////////////////////////////// void InitAplication()
{
//. inits Mac's user interface

InitGraf(&thePort);
     InitFonts();
     FlushEvents(everyEvent, 0);
     InitWindows();
     InitMenus();
     InitCursor();
     TEInit();
     InitDialogs(0L);
/*   MaxApplZone();*/
} typedef unsigned char   uchar_v[DIM4],*uchar_p;
static  double   Pi=3.141592;
static  void     calcPi() { Pi=acos(-1.); } static  void     dotp_of_sysv(uchar_v dotp, uchar_v sysv)    /*
-------------------========================--------------------------- */
{
  short register i;
  LOOP_DIM4(i)   dotp[i]=100-sysv[i]/2.55;
  return;
}
static  void     sysv_of_dotp(uchar_v sysv, uchar_v dotp)    /*
-------------------========================--------------------------- */
{
``` swmt.c
Sunday, 21 August 1994  10:33
Page 6

```c
    short register i;
    LOOP_DIM4(i)  sysv[i]=255-dotp[i]*2.55;
    return;
} static  void    lhs_of_lab(float lhs[DIM3], float lab[DIM3])    /*
------------------=========----------------------------------------- */
{
    lhs[0]=lab[0];
    lhs[1]=atan2(lab[2],lab[1])*180./Pi;
    if(lhs[1]<0)    lhs[1]+=360.;  // Hue must be positive for obHiv to work.
    lhs[2]=sqrt(lab[1]*lab[1]+lab[2]*lab[2]);
    return;
}
static  void    lab_of_lhs(float lab[DIM3], float lhs[DIM3])    /*
------------------=========----------------------------------------- */
{
    double a=lhs[1]*Pi/180.;
    lab[0]=lhs[0];
    lab[1]=lhs[2]*cos(a);
    lab[2]=lhs[2]*sin(a);
    return;
}
static  void    lhs_of_cmyk(float lhs[DIM3], uchar_v cmyk)    /*
------------------==========---------------------------------------- */
{
// Use Simplex for the CMYK to Lab conversion
    float   lab[3];
    uchar_v clab;
    Simplex(cmyk,clab,NDLis[0]);
    lab[0]=clab[0]/2.55;
    lab[1]=clab[1]-128.;
    lab[2]=clab[2]-128.;
    lhs_of_lab(lhs,lab);
    return;
}
static  void    cmyk_of_lhs(unsigned char cmyk[DIM4], float lhs[DIM3] )    /*
------------------===========================================================-- */
{
// Use Simplex for the Lab to CMYK conversion
    float   lab[3];
    uchar_v clab;
    lab_of_lhs(lab,lhs);
    clab[0]=lab[0]*2.55;
    clab[1]=lab[1]+128;
    clab[2]=lab[2]+128;
    Simplex(clab,cmyk,NDLis[1]);
    return;
}
/////////////////////////////////////////////////////////////////////
//
// Operation on the measured data: get and find Metered
//
``` swmt.c
Sunday, 21 August 1994  10:33                                              Page 7

```c
typedef float   *meter_t;
static  meter_t MeterLab[]={NULL,NULL,NULL};
static  Size    MeterNof;
static  ty_stt  getMetered()    /* ----------------===============---- */
{
  FILE *fp;
  ty_i i,j,n;

if( (fp=fopen(MeterFileName,"r")) == NULL )
    PERR__ "failed to read from %s", MeterFileName __PERR
  PRT__(Pr.progress) "Reading Meter File %s Line ----", MeterFileName __PR
  for(i=n=0;;i++)
  {
    char line[99],txt[40];
    fgets(line,80,fp);
    PR__(Pr.progress) "\b\b\b\b%4d",i __PR
    switch(line[0])
    {
    case '!':   break;              // ! comment
    case 'E':                       // End of File
                PR__(Pr.progress) " out of %ld.",MeterNof __PR
                return(STT_OK);

case 'N':   j=sscanf(line,"%s %ld",txt,&MeterNof);  // Nof measurements
                if(MeterNof==0 || MeterNof> 10000)  PERR__ "%d measurements?",MeterNof
                LOOP_DIM3(j)    MeterLab[j]=(meter_t)NewPtr(MeterNof*sizeof(meter_t));
                break;

default:        LOOP_DIM3(j)    if(MeterLab[j]==NULL)
                            PERR__ "Add line 'Nof xxxx' " __PERR
                sscanf(line,"%f %f %f",MeterLab[0]+n,MeterLab[1]+n,MeterLab[2]+n);
                n++;
                if(n>MeterNof)  PERR__ "too many measurements: %d/%s",n,MeterNof __PER
                break;
    }
  }
}
static  ty_stt  endMetered()    /* ----------------===============---- */
{
    ty_i i;
    LOOP_DIM3(i)    DisposPtr((Ptr)MeterLab[i]);
    return(STT_OK);
}
static  ty_stt  clcMetered()    /* ----------------===============---- */
{
  ty_i i,n;
  float lab[3],lhs[3];

CHECK( initHiv() )
```

```
swmt.c
Sunday, 21 August 1994  10:33                                                     Page 8 for(n=0;n<MeterNof;n++)
  {
    LOOP_DIM3(i)    lab[i] = MeterLab[i][n];
    lhs_of_lab(lhs,lab);
    CHECK(updateHiv(lhs))
  }
  CHECK( anaHiv() )
  for(n=0;n<MeterNof;n++)
  {
    LOOP_DIM3(i)    lab[i] = MeterLab[i][n];
    lhs_of_lab(lhs,lab);
    CHECK( sumHiv(lhs) )
  }
  CHECK( getHiv(LHS_Metered) )
  PRT__(Pr.progress) "Meter LHS is %f %f %f", LHS_Metered[0], LHS_Metered[1], LHS_Mete
  {
  //. Translate to CMYK; store sysv in static Metered
    unsigned char cmyk[DIM4],dotp[DIM4];
    cmyk_of_lhs(cmyk,LHS_Metered);
    LOOP_DIM3(i)    Metered[i]=cmyk[i];
/// PRT__(Pr.progress) "Meter CMY is %d %d %d", Metered[Cy], Metered[Mg], Metered[Yl]
    dotp_of_sysv(dotp,cmyk);
    PRT__(Pr.progress) "Meter %%dot is %d %d %d", dotp[Cy], dotp[Mg], dotp[Yl] __PR
  }
  return(STT_OK);
}

/////////////////////////////////////////////////////////////////////
//
// Operations on the CT file: Gradation
//
//
static  unsigned char    Grad[DIM3][256];

static  void    makeGrad(short sep, double maxat, double desired)     /*
-------------------============================================------ */
{
  short i;
  double x, pl, a, f=1./255.;
  pl= Power/100.;

if(maxat==desired)
  {
  //. gradation curve for no change at all, fix bug on 21/6/94
    for(i=0;i<256;i++)   Grad[sep][i]=i;
  }
  else if(maxat==255) for(i=0;i<256;i++)
  {
      double x,y;
      short  d=(desired-maxat)*(100+OverShoot)*0.01;

y = d * pow( (double)10, (double)(-0.01)*(maxat-i) ) ;
```

56 swmt.c
Sunday, 21 August 1994  10:33
Page 9

```
        PR__(Pr.debug) "\n[%1d,%3d] y=%lf",sep,i,y __PR if(i+y>255.)       Grad[sep][i] = 255 ;
        else if(i+y<0)     Grad[sep][i] = 0 ;
        else               Grad[sep][i] = i+y ;

PR__(Pr.debug) "-> %3d",(short)Grad[sep][i] __PR
      }
    else
    {
      a = log((double)0.5)/log(maxat*f);
      for(i=0;i<256;i++)
      {
        double x,y;
        short  d=(desired-maxat)*(100+OverShoot)*0.01;

y = d * pow( ( x = sin( Pi * pow(i*f,a) ) ), p1 ) ;

PR__(Pr.debug) "\n[%1d,%3d] (%lf)=%lf x=%lf y=%lf",sep,i,a,pow(i*f,a),x,y __PR if(i+y>255.)       Grad[sep][i] = 255 ;
        else if(i+y<0)     Grad[sep][i] = 0 ;
        else               Grad[sep][i] = i+y ;

PR__(Pr.debug) "-> %3d",(short)Grad[sep][i] __PR
      }
  }
  return;
} static  ty_stt  plotGradMap()   /*
----------------================--- */
{
  string   map[20];
  short i,k;
  for(i=0;i<20;i++)
  {
    short j;
    map[i]=(char *)malloc((size_t)61);
    if(map[i]==NULL)    PERR__ "failed to malloc map" __PERR
    for(j=0;j<60;j++)  (map[i])[j]=' ';
  }
  for(i=0;i<20;i++)  (map[i])[60-3*i]='/';
  for(i=0;i<20;i++)  (map[i])[60]='\0';
  for(k=0;k<256;k++)
  {
    short j,s;
    j=60*k/256;
    LOOP_DIM3(s)
    {
      i=19-20*Grad[s][k]/256;
``` swmt.c
Sunday, 21 August 1994  10:33                                                              Page 10

```c
      if(j>=60 || i>=20)    PERR__ "tried to plot [%d,%d]",j,i __PERR
      (map[i])[j]='a'+s;
    }
  }
  for(i=0;i<20;i++) printf("\n|%s",map[i]);
  printf("\n+----------------------------------------------------------------");
  return(STT_OK);
} static void    writeGrad()    /*
------------------============-- */
{
  typ_file fpg;
  ty_i i;
  if(GradWrite==0)  return;
  fpg=fopen("SwMt_Gradation_to_Whisper","w");
  if(fpg==NULL) return;
  PRT__(Pr.progress) "writing Gradation text to be transported to Whisper" __PR
  LOOP_DIM4(i)
  {
    ty_i j;
    for(j=0;j<256;j++)
    {
      if(i==Bk) fprintf(fpg,"%d\n",(int)j*64);
      else      fprintf(fpg,"%d\n",(int)Grad[i][j]*64);
    }
  }
  fprintf(fpg,"end of gradation from Mac SwMt to Whisper");
  return;
}
static void    passGrad(unsigned char *out, unsigned char *in)   /*
------------------=====================================- */
{
  short register i;
  LOOP_DIM3(i)  out[i]=Grad[i][in[i]];
  out[Bk]=255;
  return;
} static ty_stt  changepixel(uchar_p cmyk[DIM4], long h, long w)   /*
------------------=====================================- */
{
  ty_stt stt=STT_OK;
  unsigned char sepin[DIM4], sepout[DIM4];

sepin[Cy]=(*(cmyk[Cy]));
  sepin[Mg]=(*(cmyk[Mg]));
  sepin[Yl]=(*(cmyk[Yl]));
  sepin[Bk]=(*(cmyk[Bk]));

switch(Pass)
  {
```

58

```
swmt.c                                                                  Page 11
Sunday, 21 August 1994   10:33 case 1: // CTanaPass
       {
           float lhs[DIM3];

if(sepin[Bk]!=0)    return(stt); // Analyze Under Mask of Bk=100% lhs_of_cmyk(lhs,sepin);
           updateHiv(lhs);
       }
       return(stt);

case 2: // CTan2Pass
       {
           float lhs[DIM3];

///////  set_watch_dog((int)h);

if(sepin[Bk]!=0)    return(stt); // Analyze Under Mask of Bk=100% lhs_of_cmyk(lhs,sepin);
           sumHiv(lhs);
       }
       return(stt);

case 3: // CTgrdPass if(sepin[Bk]==0 || NoMask)    // Change, usually Under Mask of Bk=100%
       {
           passGrad(sepout,sepin);
           *(cmyk[Cy])=sepout[Cy];
           *(cmyk[Mg])=sepout[Mg];
           *(cmyk[Yl])=sepout[Yl];
           *(cmyk[Bk])=sepout[Bk];
       } if(Pr.map) if(h<256 && w<256)
       {
         short register s;
         s=w%3;
         if(Grad[s][w]==255-h)          *(cmyk[Bk])=s;
         if(Pr.map==2) // Pr.map=2: paint solid desired color square
         {
           *(cmyk[Cy])=Metered[Cy];
           *(cmyk[Mg])=Metered[Mg];
           *(cmyk[Yl])=Metered[Yl];
         }
       } return(stt);

default:   PERR__ "Pass %d ?",Pass __PERR
    }
}
```

```
swmt.c                                                          Page 12
Sunday, 21 August 1994   10:33 ty_stt changebuf(buf,size,h) uchar_p buf; long size, h; /*
-----=========================================================- *
change buf of size which is line h.                             */
{
    ty_stt stt=STT_OK;
    long i,w;
    short s;
    uchar_p cmyk[DIM4];

if(doSkip(1))   return(STT_OK);

w=size/4;
    LOOP_DIM4(s) cmyk[s]=buf+s*w;
    for(i=0;i<w;i++)
    {
        if(!doSkip(0)) CHECK( changepixel(cmyk,h,i) )
        LOOP_DIM4(s) cmyk[s]++;
    }
    return(stt);
}

/*ent*/ ty_stt  be_nice()
{
    ty_stt stt=STT_OK;
    EventRecord theEvent;
    SystemTask ();       /* Handle desk accessories */
    if(GetNextEvent(everyEvent,&theEvent))
    {
    }
    return(stt);
} static  ty_stt   CTanaPass(short refnum, CTpars_t *ctp)  /*
---------------=========================================----- */
{
    ty_stt stt=STT_OK;
    long    read_size,size,height;
    unsigned char   *buf;
    short hmax;

Pass=1;
    resetSkip();

read_size = size = ctp->s*ctp->wl;
    buf = (unsigned char *)NewPtr(size);
    if(buf==NULL)    PERR__ "Failed to allocate buffer for CT line, %ld", size __PERR PRT__(Pr.true) "CTanaPass: Processing Line --------" __PR for(height=0; height<ctp->h && read_size==size; height++)
```

60

```
swmt.c                                                              Page 13
Sunday, 21 August 1994   10:33

{
        CHECK( be_nice() )
        if(height%10==0)  PR__(Pr.true) "\b\b\b\b\b\b\b\b%8ld",height __PR
        CHECK( readonlyCTline(refnum,read_size,buf,height) )
    }

DisposPtr( (Ptr)buf );

return(stt);
}
static  ty_stt  CTan2Pass(short refnum, CTpars_t *ctp)   /*
---------------=========================================------ */
{
    ty_stt stt=STT_OK;
    long   read_size,size,height;
    unsigned char  *buf;

Pass=2;
    resetSkip();

read_size = size = ctp->s*ctp->wl;
    buf = (unsigned char *)NewPtr(size);
    if(buf==NULL)   PERR__ "Failed to allocate buffer for CT line, %ld", size __PERR CHECK( resetCTdata(refnum) )

PRT__(Pr.true) "CTan2Pass: Processing Line --------" __PR for(height=0; height<ctp->h && read_size==size; height++)
    {
        CHECK( be_nice() )

if(height%10==0)  PR__(Pr.true) "\b\b\b\b\b\b\b\b%8ld",height __PR
        CHECK( readonlyCTline(refnum,read_size,buf,height) )
    }

DisposPtr( (Ptr)buf );

return(stt);
}
static  ty_stt  CTgrdPass(short refnum, CTpars_t *ctp)   /*
---------------=========================================------ */
{
    ty_stt stt=STT_OK;
    long   read_size,size,height;
    unsigned char  *buf;

Pass=3;
    resetSkip();

read_size = size = ctp->s*ctp->wl;
    buf = (unsigned char *)NewPtr(size);
    if(buf==NULL)   PERR__ "Failed to allocate buffer for CT line, %ld", size __PERR
```

61

```
    CHECK( resetCTdata(refnum) )

PRT__(Pr.true) "CTgrdPass: Processing Line --------" __PR for(height=0; height<ctp->h && read_size==size; height++)
    {
        CHECK( be_nice() )
        if(height%10==0)  PR__(Pr.true) "\b\b\b\b\b\b\b\b%8ld",height __PR
        processCTline(refnum,read_size,buf,height);
    } return(stt);
} main()  /*
======= */
{
    CTpars_t    CTpars;
    short       RefNum;
    ty_i        i;
    typ_fname   fnames[2];
    DateTimeRec now;

InitAplication();
    get_prs();
    get_meter_file_name();
    calcPi();
    GetTime(&now);

FPLog=fopen("swatchmatch.log","a");
    WR__ "\nDate: %d/%d/%d      Time: %d:%d:%d\n", now.day,now.month,now.year,now.hour
    {
    //. prepare for converting CMY to LHS and back;
    //  conv_dat[2] := color book data, to and from Lab;
    //  gpar        := grid of NDL
    //  NDLis[2]    := indexes in Simply's internal tables on the two NDLs;

typ_data   conv_dat[]={NULL,NULL};
        ty_i       gpar;

CHECK( getbooks(conv_dat,&gpar,fnames) )
        CHECK( SimplexStart(conv_dat[0],gpar,NDLis  ,"Lab",fnames[0]) )
        CHECK( SimplexStart(conv_dat[1],gpar,NDLis+1,"CMY",fnames[1]) )
    }

CHECK( getMetered() )
    CHECK( clcMetered() )
    CHECK( endMetered() )

CHECK( openCTfile(&RefNum,&CTpars))
    PRT__(Pr.true) "File is opened: %ld x %ld ",CTpars.w,CTpars.h __PR
``` swmt.c                                                                   Page 15
Sunday, 21 August 1994  10:33

CHECK( initHiv() )
        CHECK( CTanaPass(RefNum, &CTpars) )
        CHECK( anaHiv() )
        CHECK( CTan2Pass(RefNum, &CTpars) )
        {
        // Gradation <- LHS change
            float  lhs_image[DIM3],lhs_meter[DIM3];
            unsigned char   sysv_image[DIM4],sysv_meter[DIM4],
                            dotp_image[DIM4],dotp_meter[DIM4];
            short sep;

CHECK( getHiv(lhs_image) )
            PRT__(Pr.true) "Main image LHS is (%5.2f,%5.2f %5.2f)",lhs_image[0],lhs_image[ cmyk_of_lhs(sysv_image,lhs_image);
            dotp_of_sysv(dotp_image,sysv_image);
            PRT__(Pr.true) "= %%dot (%3d,%3d,%3d)",dotp_image[Cy],dotp_image[Mg],dotp_imag LOOP_DIM3(sep)  lhs_meter[sep]=LHS_Metered[sep];
            lhs_meter[0]=lhs_meter[0]*(1.-Lfactor/100.)+lhs_image[0]*Lfactor/100.;
            cmyk_of_lhs(sysv_meter,lhs_meter);
            dotp_of_sysv(dotp_meter,sysv_meter);
            PR__(Pr.true) " -> (%3d,%3d,%3d)",dotp_meter[Cy],dotp_meter[Mg],dotp_meter[Yl]

LOOP_DIM3(sep)  makeGrad(sep,(double)sysv_image[sep],(double)sysv_meter[sep]);
            plotGradMap();
            writeGrad();

WR__  "\n Meter File = %s", MeterFileName __WR
            WR__  "\n Metered = %3d %3d %3d, Power= %3d, Lfactor=%3d, Skip=%2d %2d, NoMask=
                    Metered[0],Metered[1],Metered[2],Power,Lfactor,Skip[0],Skip[1],NoMask,
            WR__  "\n image LHS is (%5.2f,%5.2f %5.2f)",lhs_image[0],lhs_image[1],lhs_image
            WR__  "\n = %%dot (%3d,%3d,%3d)",dotp_image[Cy],dotp_image[Mg],dotp_image[Yl] _
            WR__  "    -> (%3d,%3d,%3d)",dotp_meter[Cy],dotp_meter[Mg],dotp_meter[Yl] __WR
            WR__  "\n ------------------------------------------------------------

}

CHECK( CTgrdPass(RefNum, &CTpars) )

//
// close, dispose & free
//
        closeCT(RefNum);
        for(i=0;i<2;i++)    SimplexStop(NDLis[i]);

if(FPLog!=NULL) fclose(FPLog);

return;
    }

63

Swmtdt.C
Thursday, 4 August 1994 16:31

Page 1

```c
/*.bs Header*/
/****************************************************************
 *
 * Data of swmt. Yoav Bresler
 *
 ****************************************************************
 */
/*.be Header*/
include <stdlib.h>
define   VAX_NOT_PRISMA include  "fwp.h"
static    char MyName[MAX_REMARK]="data";
static    char MyTab[MAX_REMARK]="\n<d>";

extern    ty_pr    Pr;

#define   GRID_ITSELF  (-222.22)

/*ent*/   int isGridItself(lab) float *lab;  /*
---------------================================-- */
{
  ty_i i;
  float d,sd=0;
  LOOP_DIM3(i)
  {
    d=lab[i]-GRID_ITSELF;
    sd+=d*d;
  }
  return(sd<1.);
}
#define   ENDOFGRID  (ty_i)(-1)

/*ent*/   int  read_Data_grid(ty_i nof[DIM4], ty_i grid[DIM4][33], string name)
{
  ty_i   n;
  typ_file fpi;

fpi=fopen(name,"r");
  if(fpi==NULL) return(0);

LOOP_DIM4(n) nof[n]=0;
  for(n=0;;n++)
  {
    short cmyk[DIM4],i;
    float flab[DIM3];
    char  t[3][40],line[99];
```

Swmtdt.C  Page 2
Thursday, 4 August 1994 16:31

```
    for(line[0]='!';line[0]=='!';)     fgets(line,80,fpi);
    sscanf(line,"%s %s %f %f %f %s %d %d %d %d",
       t[1],t[2],flab,flab+1,flab+2,t[0],cmyk,cmyk+1,cmyk+2,cmyk+3);
       if(isGridItself(flab))
    {
     /*. it is grid, can get */
     LOOP_DIM4(i)
     {
        /*. has grid ended? -no: get it */
        if(cmyk[i]>=0)
        {
           /*. get nof and grid of sep. */
           grid[i][nof[i]]=cmyk[i];
           nof[i]++;
        }
     }
    }
    else
    {
     /*. tidy up */
       PRT__(Pr.progress) " Grid: " __PR
     LOOP_DIM4(i)
     {
       /*. print nof & grid */
       ty_i j;
         PRT__(Pr.progress) " %d: %d = ",i,nof[i] __PR
         for(j=0;j<nof[i];j++) PR__(Pr.progress) "%d ",grid[i][j] __PR
     }
       fclose(fpi);
       return(n);
    }
   }
 } static    ty_i DataLevel=0;
static    ty_i DataSize=3000;

/*.bs.pg next page: Allocations*/
/*ent*/   ty_stt   myAlloc(p,n,t) Size n; short **p; char *t; /*
---------------===========-------------------------- */
{
/*. allocate in Intel's memory */
/*i*/ if( (*p=malloc(n)) == NULL ) PERR__
/*i*/ "allocating %d bytes for %s", n, t
/*i*/ __PERR
/*i*/
/*i*/ return(STT_OK);
}
```

```
Swmtdt.C
Thursday,  4  August  1994 16:31                                    Page 3 void myFree(p)      short **p;
{
  free(*p);
 *p=NULL;
  return;
}
/*.be next page: Allocations*/

/*ent*/  ty_stt   add_Data(pdat,lab,cmyk) typ_data *pdat;  short *lab,*cmyk; /*
---------------=========================----------------------------------- */
{
/*. - *pdat <- lab, cmyk */
  typ_data  dat=(*pdat);
  DataLevel++;
  if(dat==NULL)
  {
  /*. prepare new one */
    char    text[80];
    int     size = DataSize*sizeof(short);
    short   *pt;
    ty_stt  stt  = myAlloc(&pt,sizeof(ty_data),"data") ;
    if(stt==STT_OK) dat = (*pdat) = (typ_data)pt;
    if(dat==NULL)   return(STT_FAIL);

sprintf(text,"Lab data at level %d",DataLevel);
    CHECK(myAlloc(&(dat->lab.l),size,text))
    CHECK(myAlloc(&(dat->lab.a),size,text))
    CHECK(myAlloc(&(dat->lab.b),size,text))

sprintf(text,"CMYK data at level %d",DataLevel);
    CHECK(myAlloc(&(dat->cmyk.c),size,text))
    CHECK(myAlloc(&(dat->cmyk.m),size,text))
    CHECK(myAlloc(&(dat->cmyk.y),size,text))
    CHECK(myAlloc(&(dat->cmyk.k),size,text))

dat->nof=0;
    dat->max=DataSize;
    dat->next=NULL;
  }
  if( dat->nof < dat->max )
  {
  /*. - dat <- lab, cmyk */
    if(dat->lab.l==NULL)     return(STT_FAIL);
    if(dat->lab.a==NULL)     return(STT_FAIL);
    if(dat->lab.b==NULL)     return(STT_FAIL);
    if(dat->cmyk.c==NULL)    return(STT_FAIL);
    if(dat->cmyk.m==NULL)    return(STT_FAIL);
    if(dat->cmyk.y==NULL)    return(STT_FAIL);
    if(dat->cmyk.k==NULL)    return(STT_FAIL);
```

Swmtdt.C  
Thursday, 4 August 1994 16:31

```
    dat->lab.l[dat->nof]=lab[0];
    dat->lab.a[dat->nof]=lab[1];
    dat->lab.b[dat->nof]=lab[2];
    dat->cmyk.c[dat->nof]=cmyk[0];
    dat->cmyk.m[dat->nof]=cmyk[1];
    dat->cmyk.y[dat->nof]=cmyk[2];
    dat->cmyk.k[dat->nof]=cmyk[3];
   dat->nof++;
   DataLevel=0;
    return(STT_OK);
  }
  {
    typ_data pd = (typ_data)dat->next ;
    CHECK( add_Data(&pd,lab,cmyk))
    dat->next = (void *)pd;
  }
   return(STT_OK);
}
/*ent*/  ty_stt   copy_Data(pdat,idat)     typ_data *pdat,idat;   /*
---------------===========================---------------------- */
{
  typ_data odat=NULL;
  ty_i     n;

DataLevel++;
  *pdat=NULL;

if(idat==NULL)
  {
  /*. normal exit */
    DataLevel=0;
    return(STT_OK);
  }

{
  /*. prepare new *pdat */
    char   text[80];
    int        size = DataSize*sizeof(short);
    short  *pt;
     ty_stt  stt  = myAlloc(&pt,sizeof(ty_data),"data") ;
    if(stt==STT_OK) odat = (*pdat) = (typ_data)pt;
    if(odat==NULL)  return(STT_FAIL);

sprintf(text,"Lab data for copy at level %d",DataLevel);
    if(idat->lab.l ==NULL)     odat->lab.l=NULL;
    else           CHECK(myAlloc(&(odat->lab.l),size,text))
    if(idat->lab.a ==NULL)     odat->lab.a=NULL;
    else           CHECK(myAlloc(&(odat->lab.a),size,text))
    if(idat->lab.b ==NULL)     odat->lab.b=NULL;
```

```
Swmtdt.C                                                                    Page 5
Thursday,  4  August  1994 16:31 else              CHECK(myAlloc(&(odat->lab.b),size,text))

sprintf(text,"CMYK data for copy at level %d",DataLevel);
    if(idat->cmyk.c==NULL)    odat->cmyk.c=NULL;
      else              CHECK(myAlloc(&(odat->cmyk.c),size,text))
    if(idat->cmyk.m==NULL)    odat->cmyk.m=NULL;
      else              CHECK(myAlloc(&(odat->cmyk.m),size,text))
    if(idat->cmyk.y==NULL)    odat->cmyk.y=NULL;
      else              CHECK(myAlloc(&(odat->cmyk.y),size,text))
    if(idat->cmyk.k==NULL)    odat->cmyk.k=NULL;
      else              CHECK(myAlloc(&(odat->cmyk.k),size,text))

odat->nof=idat->nof;
    odat->max=DataSize;
} for(n=0;n<idat->nof;n++)
  {
/*. copy */
     if(idat->lab.l !=NULL)      odat->lab.l[n]  =idat->lab.l[n];
     if(idat->lab.a !=NULL)      odat->lab.a[n]  =idat->lab.a[n];
     if(idat->lab.b !=NULL)      odat->lab.b[n]  =idat->lab.b[n];
     if(idat->cmyk.c!=NULL)      odat->cmyk.c[n]=idat->cmyk.c[n];
     if(idat->cmyk.m!=NULL)      odat->cmyk.m[n]=idat->cmyk.m[n];
     if(idat->cmyk.y!=NULL)      odat->cmyk.y[n]=idat->cmyk.y[n];
     if(idat->cmyk.k!=NULL)      odat->cmyk.k[n]=idat->cmyk.k[n];
  }
  {
    ty_stt tstt;
     typ_data  pd = (typ_data)odat->next ;
     typ_data  qd = (typ_data)idat->next ;
     tstt=copy_Data(&pd,qd);
    odat->next = (void *)pd ;
    return(tstt);
  }
}
/*ent*/   ty_stt    set_Data(dat,lab,cmyk,n)   /*
---------------========================== */
  typ_data dat;
  short  *lab,*cmyk;
  ty_i    n;
{
/*. - *pdat <- lab, cmyk */
  DataLevel++;
  if(dat==NULL)     PERR__ "can't set in empty data" __PERR
  if( n < dat->nof )
  {
  /*. - dat <- lab, cmyk */
    if(lab!=NULL)
```

68

Swmtdt.C
Thursday, 4 August 1994 16:31

```
   {
      if(dat->lab.l==NULL || dat->lab.a==NULL || dat->lab.b==NULL) return(STT_FAIL);
      dat->lab.l[n]=lab[0];
      dat->lab.a[n]=lab[1];
      dat->lab.b[n]=lab[2];
   }
   if(cmyk!=NULL)
   {
      if( dat->cmyk.c==NULL || dat->cmyk.m==NULL
       || dat->cmyk.y==NULL || dat->cmyk.k==NULL)       return(STT_FAIL);
      dat->cmyk.c[n]=cmyk[0];
      dat->cmyk.m[n]=cmyk[1];
      dat->cmyk.y[n]=cmyk[2];
      dat->cmyk.k[n]=cmyk[3];
   }
   DataLevel=0;
   return(STT_OK);
}
  else if( n < dat->max ) PERR__ "use add_Data not set_Data" __PERR
{
   typ_data pd = (typ_data)dat->next;
   CHECK( set_Data( pd, lab, cmyk, n - dat->max ) )
}
   return(STT_OK);
}
/*ent*/ ty_stt  free_Data(pdat)   typ_data  *pdat;   /*
------------================---------------------------- */
{
   typ_data dat;
   dat=(*pdat);
   if(dat==NULL) return(STT_OK);
   if(dat->lab.l!=NULL)      myFree(&(dat->lab.l));
   if(dat->lab.a!=NULL)      myFree(&(dat->lab.a));
   if(dat->lab.b!=NULL)      myFree(&(dat->lab.b));
   if(dat->cmyk.c!=NULL)     myFree(&(dat->cmyk.c));
   if(dat->cmyk.m!=NULL)     myFree(&(dat->cmyk.m));
   if(dat->cmyk.y!=NULL)     myFree(&(dat->cmyk.y));
   if(dat->cmyk.k!=NULL)     myFree(&(dat->cmyk.k));
   if(dat->next!=NULL)
   {
      typ_data pd = (typ_data)dat->next ;
      free_Data(&pd);
   } free(dat);
  *pdat=dat=NULL;

return(STT_OK);
}
```

Swmtdt.C                                                                                              Page 7
Thursday,   4   August   1994  16:31

/*ent*/   ty_stt    get_Data(typ_data  dat,  short  *lab,  short  *cmyk,  ty_i  n)        /*
----------================================================================--
    typ_data      dat;          database to search
    short       *lab,*cmyk;     item to get
    unsigned short    n;        number  of  item  to  get -------------------------*/
{
/*. - Data[n] -> lab,cmyk */
  ty_stt  stt;
  DataLevel++;
  if(dat==NULL)      return(STT_FAIL);
  if(n<0)  return(STT_FAIL);
  if( n < dat->nof )
  {
  /*. - dat[n] -> lab,cmyk */
     if(dat->lab.l==NULL)         return(STT_FAIL);
     if(dat->lab.a==NULL)         return(STT_FAIL);
     if(dat->lab.b==NULL)         return(STT_FAIL);
     if(dat->cmyk.c==NULL)         return(STT_FAIL);
     if(dat->cmyk.m==NULL)         return(STT_FAIL);
     if(dat->cmyk.y==NULL)         return(STT_FAIL);
     if(dat->cmyk.k==NULL)         return(STT_FAIL);
     lab[0]=dat->lab.l[n]   ;
     lab[1]=dat->lab.a[n]   ;
     lab[2]=dat->lab.b[n]   ;
     cmyk[0]=dat->cmyk.c[n] ;
     cmyk[1]=dat->cmyk.m[n] ;
     cmyk[2]=dat->cmyk.y[n] ;
     cmyk[3]=dat->cmyk.k[n] ;
     DataLevel=0;
     return(STT_OK);
  }
  else if( n < dat->max)   return(STT_END);
  else if( dat->next == NULL)  return(STT_END);
  stt = get_Data((typ_data)(dat->next),lab,cmyk,  n - dat->nof ) ;
  return(stt);
} static    ty_stt    write_Data(fp,dat)  typ_file  fp;  typ_data dat;   /*
---------------=====================---------------------  */
{
  DataLevel++;
  fprintf(fp,"!Level %d: ",DataLevel);
  if(dat==NULL)
  {
      fprintf(fp," is empty ! \n");
      return(STT_OK);
  }
   else if( dat->lab.l==NULL || dat->lab.a==NULL || dat->lab.b==NULL )
   {

70

Swmtdt.C
Thursday, 4 August 1994 16:31

```
      fprintf(fp,"is mising Lab ! \n");
      return(STT_FAIL);
    }
    else if( dat->cmyk.c==NULL || dat->cmyk.m==NULL
         || dat->cmyk.y==NULL || dat->cmyk.k==NULL )
    {
      fprintf(fp,"is mising CMYK ! \n");
      return(STT_FAIL);
    }
    else
    {
    /*. print lab,cmyk of current level */
      ty_i i;
      fprintf(fp,"has %d lines : \n",dat->nof);
      for(i=0;i<dat->nof;i++)
    {
      CHECK(be_nice())
      printer();
      fprintf(fp,"%d %d %5.2f %5.2f %5.2f",
      i,DataLevel,
         dat->lab.l[i]/Integer_Factor,
         dat->lab.a[i]/Integer_Factor,
         dat->lab.b[i]/Integer_Factor );
      fprintf(fp," : %3d %3d %3d %3d \n",
      dat->cmyk.c[i],dat->cmyk.m[i],dat->cmyk.y[i],dat->cmyk.k[i] );
    }
  }
  CHECK( write_Data(fp,(typ_data)(dat->next) ) )
  return(STT_OK);
}

/*ent*/ ty_stt   write_all_Data(name,dat)  string name; typ_data dat; /*
---------------============================----------------------------- */
{
/*. - open file, write_Data, close */
  typ_file   fp;

PRT__(Pr.prgrs) "write data to %s",name __PR fp=fopen(name,"w");
  if(fp==NULL) return(STT_FAIL);
  fprintf(fp,"!data: Lab vs. CMYK file : \n! '%s':\n",name);
  DataLevel=0;
  write_Data(fp,dat);
  DataLevel=0;
  fprintf(fp,"!End");
  fclose(fp);
  return(STT_OK);
}
```

Swmtdt.C
Thursday, 4 August 1994 16:31

Page 9

```
/*ent*/  ty_stt   read_Data(name,pdat)   string name;  typ_data *pdat;  /*
---------------=================--------------------------------  */
{
/*. - open file, read Data, close */
   ty_i      i;
   typ_file  fp;
   typ_fname text;

PRT__(Pr.prgrs) "read data from %s",name __PR sprintf(text,"%s%s",Directory,name);
    fp=fopen(text,"r");
   if(fp==NULL) PERR__ "Failed to read from file '%s'!",text __PERR for(i=1;i;i++)
  {
     char line[80];
      fgets(line,80,fp);
      if(line[0]!='!')
    {
     /*. read line, check, add Data */
     short j;
      char  txt[3][40];
      float lab[DIM3];
       short cmyk[DIM4],ilab[DIM3];
       sscanf(line,"%s %s %f %f %f %s %d %d %d %d",
           txt[0],txt[1],  lab,lab+1,lab+2,  txt[2],  cmyk,cmyk+1,cmyk+2,cmyk+3);

if(isGridItself(lab)) PRT__(Pr.prgrs) "Read Grid %3d %3d %3d %3d",
                    cmyk[0],cmyk[1],cmyk[2],cmyk[3] __PR
        else
        {
/*!*/ LOOP_DIM3(j)     if(lab[j]>  320. ) lab[j]=  320. ;
/*!*/ LOOP_DIM3(j)     if(lab[j]<(-320.)) lab[j]=(-320.);

LOOP_DIM3(j) ilab[j]=  lab[j]*Integer_Factor;

LOOP_DIM3(j) ilab[j]=  lab[j]*Integer_Factor;
       CHECK( add_Data(pdat,ilab,cmyk))
/*    PR__(Pr.debug) "[%d]",i __PR
 *       if(i%13==0) PR__(Pr.debug) "\n",i __PR
 */     printer();
     }
    }
     else if(line[1]=='E') /* "!End" -> end */  i=(-1);
  }
/*PR__(Pr.debug) "[END]\n",i __PR
 */
```

Swmtdt.C
Thursday, 4 August 1994 16:31

```
    fclose(fp);
    return(STT_OK);
} static    int compare_grids(ty_i nof[DIM4],ty_i count[DIM4][256],short ogrid[DIM4][33])
{
    short  i,j;

LOOP_DIM4(i)
    {
    for(j=0;j<nof[i]-1;j++)
    {
        if (count[i][j]!=ogrid[i][j]) return(0);
    }
    }
    return(1);
}

/*ent*/  ty_stt    grid_Data(pdat,dat)  typ_data  *pdat,dat;  /*
----------------=====================---------------------- */
{
/*. obsolute */
    PRT__(Pr.true) " don't use grid_Data, use gridoData" __PR
    return(STT_FAIL);
}
/*ent*/  ty_stt    gridoData(pdat,dat,ogrid)   /*
----------------======================= */
    typ_data *pdat,dat;
    short     ogrid[DIM4][33];   /* SysV eg. 0,...255,-1 */
{
/*. find the grid on which the data sits */
    /*.bs local variables*/
    ty_i    i,n,nof[DIM4];
    typ_i   ndl[DIM4];
    Size    size=1;
    ty_stt  stt;
    typ_data ndat=NULL;
    /*.be local variables*/

/*.bs count 4x256 init. to 0*/
    ty_i    count[DIM4][256];
    LOOP_DIM4(i) for(n=0;n<256;n++)    count[i][n]=0;
    /*.be count 4x256 init. to 0*/ for(n=0,stt=STT_OK; stt==STT_OK; n++)
    {
        /*. fill count*/
        short  lab[DIM3],cmyk[DIM4];
        stt = get_Data(dat,lab,cmyk,n);
```

Swmtdt.C  Page 11
Thursday, 4 August 1994 16:31

```c
  if(stt==STT_OK)
  {
    /*. count[all][cmyk]++*/
    LOOP_DIM4(i)
    {
      /*. count[i][cmyk[i]]++*/
      int v = cmyk[i];
        if(v==256) v=255; /* ugly fix */
      if(v>=0 && v<256)  count[i][v]++;
    }
  }
}
LOOP_DIM4(i)
{
  /*. count:=grid size:=ndl size*/
  unsigned long nx,sx,sxx;
  float avg,sdev;

PRT__(Pr.debug) " Sep.%ld grid count:",i __PR
  for(sx=sxx=nx=n=0;n<256;n++)   if(count[i][n])
  {
    /*. nx,sx,sxx*/
    PR__(Pr.debug) " %d", count[i][n] __PR
    nx++;
    sx+=count[i][n];
    sxx+=count[i][n]*count[i][n];
  }
  avg = sx/nx ;
  sdev = (sx*sx-sxx)/(nx*nx);
  PR__(Pr.debug) " avg=%5.2f sd=%5.2f \n\t\t big:", avg,sdev __PR
  for(nof[i]=n=0;n<256;n++)   if(count[i][n])
  {
    /*. if count[i][n] ok then count[i][nof[i]++]=n*/
    unsigned long nn = count[i][n]*count[i][n] ;
    if(nn>=(avg-sdev))
    {
      /*. count[i][nof[i]++]=n*/
      PR__(Pr.debug) " %d", count[i][n] __PR
      count[i][nof[i]++]=n;
    }
  }
  size*=nof[i];
  count[i][nx]=ENDOFGRID;
}
LOOP_DIM3(i)
{
  short *pt = (short *)ndl[i];
    CHECK( myAlloc(&pt,size*sizeof(short),"grid data ndl") )
  ndl[i]= (typ_i)pt;
```

74

```
}
  ndl[3]=NULL;   /* signal to fmodelk that output is 3D */ for(n=0,stt=STT_OK; stt==STT_OK; n++)
  {
  /*. sort dat -> ndl,ndat */
    short   lab[DIM3],cmyk[DIM4];
     stt = get_Data(dat,lab,cmyk,n);
    if(stt==STT_OK)
    {
        /*. fill ndl if in grid, else fill ndat*/
        ty_i found=0,fat[DIM4];
      LOOP_DIM4(i)
      {
          /*. found = no.f sep.s that are in grid*/
          ty_i j;
           if(cmyk[i]==256) cmyk[i]=255; /* ugly fix */
        for(j=0;count[i][j]!=ENDOFGRID; j++)
        {
            /*. if cmyk[i] in grid, found++*/
            if(count[i][j]==cmyk[i])
            {
               /*. found at j; break j loop;*/
               found++;
               fat[i]=j;
               break;
            }
         }
       }
        if(found==DIM4)
        {
         /*. data belogs to the grid */
           ty_i index = fat[Cy]
           + nof[Cy]*(fat[Mg]
           + nof[Mg]*(fat[Yl]
           + nof[Yl]* fat[Bk]));
        LOOP_DIM3(i) ndl[i][index]=lab[i];
      }
       else
       {
          PRT__(Pr.debug) "ungrided %d: %d %d %d %d",
             n,cmyk[0],cmyk[1],cmyk[2],cmyk[3]  __PR
           stt = add_Data(&ndat,lab,cmyk); /* add ungrided */
      }
    }
  }
  if(stt==STT_FAIL) return(stt);

if(compare_grids(nof,count,ogrid))
```

Swmtdt.C
Thursday, 4 August 1994 16:31

Page 13

```
{
//. Is there any work to do? - no: copy and exit!
        copy_Data(pdat,dat);
        return(STT_OK);
}

{
/*. dat := expanded grided*/
  float    outgrd[33][DIM4];
  unsigned length[DIM4];
  ty_i g[DIM4],manof=0;
  for(n=0;n<33;n++) LOOP_DIM4(i) outgrd[n][i]=ENDOFGRID;
/*
*   LOOP_DIM4(i)  if(manof<nof[i])    manof=nof[i];
*   for(n=0;n<manof;n++)
*   {
*   **. add grid itself **
*     short lab[DIM3],cmyk[DIM4];
*     LOOP_DIM3(i) lab[i]=GRID_ITSELF*Integer_Factor;
*     LOOP_DIM4(i) cmyk[i]=count[i][n];
*      CHECK( add_Data(pdat,lab,cmyk,n) )
*     LOOP_DIM4(i) if(count[i][n]==ENDOFGRID) count[i][n+1]=ENDOFGRID;
*   }
*/
    if( prepareApprox (nof,count,ndl) )
    PERR__ "in prepareApprox(%d %d %d %d)",nof[Cy],nof[Mg],nof[Yl],nof[Bk]
    __PERR
    LOOP_DIM3(i)
    {
      free(ndl[i]);
      ndl[i]=NULL;
    }

{
    /*. prepare output grid */
      LOOP_DIM4(i) for(n=0;ogrid[i][n]>=0 && n<33;n++) length[i]=n+1;
      LOOP_DIM4(i)
      {
        /*. prepare outout grid of separation */
        typ_i ci = count[i];
        ty_i  ni = nof[i];
        if(ni==1)
        {
          /*. 3d Bk only */
          length[i]=1;
          outgrd[0][i] = 256. ;
        }
        else
        {
```

Swmtdt.C
Thursday, 4 August 1994 16:31

Page 14

```c
        /*. 4d or cmy */
        ty_i l=length[i]-1;
        for(n=0;n<l;n++)  outgrd[n][i]=ogrid[i][n];
        outgrd[l][i] = 256.;
    }
    }
#ifdef  NOTUSED
    LOOP_DIM4(i)
    {
        /*. prepare outout grid of separation */
        typ_i ci = count[i];
        ty_i  ni = nof[i];
        if(ni==1)
        {
          /*. 3d only */
          length[i]=1;
          outgrd[0][i] = ci[0] ;
        }
        else
        {
          /*. 4d */
          length[i]=ni*2-1;
          for(n=0;n<length[i];n+=2)
          {
            /*. prepare outout grid *2 */
            outgrd[n][i]   = ci[n/2];
              outgrd[n+1][i] = (ci[n/2]+ci[n/2+1])/2.;
          }
          outgrd[length[i]-1][i] = 256.;
        }
    }
#endif
        if( prepareGrid (length,outgrd) )
            PERR__ "problem in prepareGrid()" __PERR LOOP_DIM4(i)  if(manof<length[i]) manof=length[i];
    for(n=0;n<manof;n++)
    {
      /*. add grid itself */
        short lab[DIM3],cmyk[DIM4];
        LOOP_DIM3(i) lab[i]=GRID_ITSELF*Integer_Factor;
        LOOP_DIM4(i) cmyk[i]=outgrd[n][i]+0.5;
            CHECK( add_Data(pdat,lab,cmyk) ) // bug fixed 4/5/94 ,n) Yoav
    }
    } for(g[Bk]=0;g[Bk]<length[Bk];g[Bk]++)
    for(g[Yl]=0;g[Yl]<length[Yl];g[Yl]++)
```

77

Swmtdt.C
Thursday, 4 August 1994 16:31

Page 15

```c
    for(g[Mg]=0;g[Mg]<length[Mg];g[Mg]++)
    {
      /*. loop on cyan*/
      ty_i gCy;
      float CMYBo[DIM4][33] ;
      short lab[DIM3];
      short cmyk[DIM4];

for(i=Mg;i<=Bk;i++)   cmyk[i]=outgrd[g[i]][i];

CHECK(be_nice())

if( useApprox (CMYBo,g) ) /* works on all Cyans together */
             PERR__ "in UseApprox(Cyans %3d %3d %3d)",g[Mg],g[Yl],g[Bk] __PERR PRT__(Pr.debug) "%d %d %d All -> ",g[1],g[2],g[3] __PR for(gCy=0;gCy<length[Cy];gCy++)
        {
          /*. merge expanded ndl -> dat */
          cmyk[Cy]=outgrd[gCy][Cy];
          LOOP_DIM3(i) lab[i]=CMYBo[i][gCy];
          PRT__(Pr.debug) " -> %d %d %d ",cmyk[0],cmyk[1],cmyk[2] __PR
          PR__(Pr.debug)  " : %f %f %f ",lab[0]/100.,lab[1]/100.,lab[2]/100. __PR
           if( add_Data(pdat,lab,cmyk) ) /* add grided */
              PERR__ "in add_data expanded grided" __PERR
        }
     }
       freeApprox();
   } if(ndat!=NULL)
   {
     /*. dat += ungrided part*/
     for(n=0,stt=STT_OK; stt==STT_OK; n++)
     {
       /*. merge ndat -> dat */
       short lab[DIM3],cmyk[DIM4];
         stt = get_Data(ndat,lab,cmyk,n); /* get ungrided */
         if(stt==STT_OK) stt = add_Data(pdat,lab,cmyk); /* add ungrided */
     }
       free_Data(&ndat);
   }
     if(stt==STT_FAIL)    return(stt);

return(STT_OK);
   }
```

78

STR# ".PRS strings" ID = 408 from swmt.π.rsrc

NumStrings    10
1) *****
   The string    | .PRS flags only first letters are important, must be lower case. Yoav Bresler |
2) *****
   The string    | true |
3) *****
   The string    | error |
4) *****
   The string    | warn |
5) *****
   The string    | big |
6) *****
   The string    | map |
7) *****
   The string    | # dotp 50 50 50 0<br>    = c  m  y  k |
8) *****
   The string    | # cons 20 60 0<br>= sin-power,<br>  L-mix-factor,<br>  ??? |
9) *****
   The string    | # skip 3 3 0 |
10) *****
   The string    | # over 0 0 0 |
11) *****

79

STR# "out grid def." ID = 409 from swmt.π.rsrc

```
NumStrings    4
1) *****
   The string    [16 16 16 0 i.e. 17 steps of 16]
2) *****
   The string    [tlab.cmy
                    Colorbook file name]
3) *****
   The string    [tcmy.lab
                    Colorbook inverted]
4) *****
   The string    [BordoMinolta
                    metered Lab]
5) *****
```

```
Fwp.H                                                                    Page 1
Wednesday, 4 May 1994 17:03

/****************************************************************************
 *                                                                          *
 *                    PRISMA   Prepress System                              *
 *                                                                          *
 * Copyright (c) 1985, SCITEX Corporation Ltd.                              *
 *              All Rights Reserved                                         *
 *                                                                          *
 ****************************************************************************
 *
 * Module name:        fwp.h
 * Programmer's name:  Yoav Bresler
 * Date of creation:   27-feb-90
 * Date of last change: 31-jan-94 for swmt
 * Language:           cc, c286
 * Version:            a.0
 * PURPOSE:            To be included in stage 0 source files
 ****************************************************************************
 * ADOPTED TO MAC by Yoav Bresler 21/4/94
 */
#ifndef FWP_H
define FWP_H include      <stdio.h>
static  char        *Directory="";
#define FFLUSHOUT   fflush(stdout);
#define STT_CK      0
#define STT_FAIL    (-1)
#define STT_ABORT   (-2)
#define STT_END     1
typedef int     ty_stt,*typ_stt;

#define MAX_REMARK  99
#define MAX_GRID    16
#define MAX_BK_GRID 8
#define Cy          0
#define Mg          1
#define Yl          2
#define Bk          3
#define DIM3        3
#define DIM4        4
#define LOOP_DIM3(i)    for(i=0;i<3;i++)
#define LOOP_DIM4(i)    for(i=0;i<4;i++)

define CHECK(x)    { if(x) return(STT_FAIL); } typedef char            *string;
typedef FILE            *typ_file;
typedef unsigned short  ty_i,*typ_i;    /* 0..255   */
typedef float           typ_xyz[DIM3];
typedef char            typ_fname[99];
typedef struct{
    char error; char warning;  char progress; char prgrs;
```

Fwp.H  
Wednesday, 4 May 1994 17:03
Page 2

```
     char   conv;        char debug;      char true;
     int    nr;    char  map;       char bar;      } ty_pr;

#define PROGRESS(x)  { if(Pr.progress) { printf("%s %s",MyTab,(x)); FFLUSHOUT}}
#define PRT__(x)     { if(x) { printf("%s",MyTab); printf(
#define PR__(x)      { if(x) { printf(
#define __PR         ); FFLUSHOUT}}
#define PERR__       { char esr[80]; sprintf(esr,
define __PERR       ); error_report(esr,MyName,Pr.error); return(STT_FAIL); } typedef struct {
    ty_i        nof,max;
    struct ty_data   *next;
    struct {
        short   *l,*a,*b;
        }       lab;
    struct {
        short   *c,*m,*y,*k;
        }       cmyk;
    } ty_data,*typ_data;

typedef struct {
    short  s;
    long   h,w;
    long   hl,wl;
    float  r[2];
} CTpars_t,*CTpars_tp;

static  float   Integer_Factor=100.0;   /* multiplies rgb values in fwpi.dat */ void    error_report(); /* in ..ui.c */
void    get_prsl();     /* in swmtl.c */
ty_stt  add_Data(typ_data *pd, short *l, short *c); /* in ..dt.c */
ty_stt  free_Data(typ_data *pd);
ty_stt  get_Data(typ_data dat, short *l, short *c, ty_i n);
ty_stt  write_all_Data(string name, typ_data dat);
ty_stt  read_Data(string name, typ_data *pdat);

/* in file inteface module */
ty_stt  openCTfile(short *prefnum, CTpars_tp ctp);
ty_stt  closeCT(short refnum);
ty_stt  processCTline(short refnum, long size, unsigned char *buf, long line);

ty_stt  changebuf(unsigned char *buf, long size, long line);

#endif
```

I claim:

1. A method for determining the colors with which to print an image of an object such that printed output colors approximately match colors of the object, the method comprising the steps of:

measuring colors of said object;

determining a representative image color of an object image showing mainly said object having colors, some of said colors being in vicinity, in color space, of a representative object color;

measuring a representative sample of a color gamut of a printing press on which said image is to be printed, thereby to provide a color conversion book converting from ink values to colorimeter values;

determining a representative object color of said colors of said object, the stop of determining comprising the steps of:

providing the colors of said object in luminance, hue and saturation color space;

generating representative luminance, hue and saturation values over said colors of said object; the step of generating comprising the steps of:

generating a histogram of saturation weighted hue from hue and saturation values of said colors of said object;

selecting a hue value having the highest saturation level as a representative hue;

generating a saturation level close to the saturation level at which said representative hue was found; and generating a luminance level associated with said representative hue;

utilizing said color book to convert said representative luminance, hue and saturation values to representative inking values forming said representative object color; and correcting the colors of said object image which are in the vicinity, in color space, of said representative image color, to colors in the vicinity, in color space, of said representative object color.

2. A method for determining the colors with which to print an image of an object such that printed output colors approximately match colors of the object, the method comprising the steps of:

measuring colors of said object;

measuring a representative sample of a color gamut of a printing press on which said image is to be printed, thereby to provide a color conversion book converting from ink values to colorimeter values;

determining a representative image color of an object image showing mainly said object having colors, some of said colors being in vicinity, in color space, of a representative object color; the step of determining comprising the steps of:

utilizing said color book to convert the colors of said object image from inking values to their luminance, hue and saturation values;

generating representative luminance, hue and saturation values over said colors of said object image;

utilizing said color book to convert said representative luminance, hue and saturation values to representative inking values forming said representative image color;

determining a representative object color of said colors of said object;

correcting the colors of said object image which are in the vicinity, in color space, of said representative image color, to colors in the vicinity, in color space, of said representative object color.

3. A method according to claim 2 and wherein said step of generating representative luminance, hue and saturation values over said colors of said object image comprises the steps of:

generating a histogram of saturation weighted hue from the hue and saturation values of said colors of said object image;

selecting a hue value having a highest saturation level, as the representative hue value;

generating the saturation level close to the saturation level at which said representative hue value was found; and generating a luminance level associated with said representative hue value.

* * * * *